(12) United States Patent
Nagaoka et al.

(10) Patent No.: US 8,421,331 B2
(45) Date of Patent: Apr. 16, 2013

(54) ELECTRON EMITTING ELEMENT AND METHOD FOR PRODUCING THE SAME

(75) Inventors: Ayae Nagaoka, Osaka (JP); Hiroyuki Hirakawa, Osaka (JP); Yasuo Imura, Osaka (JP); Kanako Hirata, Osaka (JP); Tadashi Iwamatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 51 days.

(21) Appl. No.: 13/074,533

(22) Filed: Mar. 29, 2011

(65) Prior Publication Data

US 2011/0241532 A1    Oct. 6, 2011

(30) Foreign Application Priority Data

Apr. 2, 2010    (JP) .................................. 2010-86069

(51) Int. Cl.
*H01J 31/00* (2006.01)
*H01J 31/26* (2006.01)

(52) U.S. Cl.
USPC ............................ 313/377; 313/399; 313/400

(58) Field of Classification Search ........................ None
See application file for complete search history.

(56) References Cited

U.S. PATENT DOCUMENTS

| | | | |
|---|---|---|---|
| 6,720,717 B2 * | 4/2004 | Komoda et al. | 313/310 |
| 6,753,196 B2 * | 6/2004 | Komoda et al. | 438/20 |
| 2003/0013215 A1 | 1/2003 | Komoda et al. | |
| 2003/0076023 A1 | 4/2003 | Komoda et al. | |
| 2010/0278561 A1 | 11/2010 | Kanda et al. | |

FOREIGN PATENT DOCUMENTS

| | | |
|---|---|---|
| JP | 01-298623 | 12/1989 |
| JP | 11-297190 | 10/1999 |
| JP | 2003-13285 | 1/2003 |
| JP | 2003-100201 | 4/2003 |

OTHER PUBLICATIONS

English machine translation of JP 11-297190 (Sato et al).*

* cited by examiner

*Primary Examiner* — Natalie Walford
(74) *Attorney, Agent, or Firm* — Nixon & Vanderhye P.C.

(57) ABSTRACT

The present invention provides an electron emitting element, comprising: a first electrode; an insulating fine particle layer formed on the first electrode and composed of insulating fine particles; and a second electrode formed on the insulating fine particle layer, wherein the insulating fine particles are monodisperse fine particles, and when voltage is applied between the first electrode and the second electrode, electrons are discharged from the first electrode into the insulating fine particle layer and accelerated through the insulating fine particle layer to be emitted from the second electrode.

22 Claims, 16 Drawing Sheets

Fig. 3
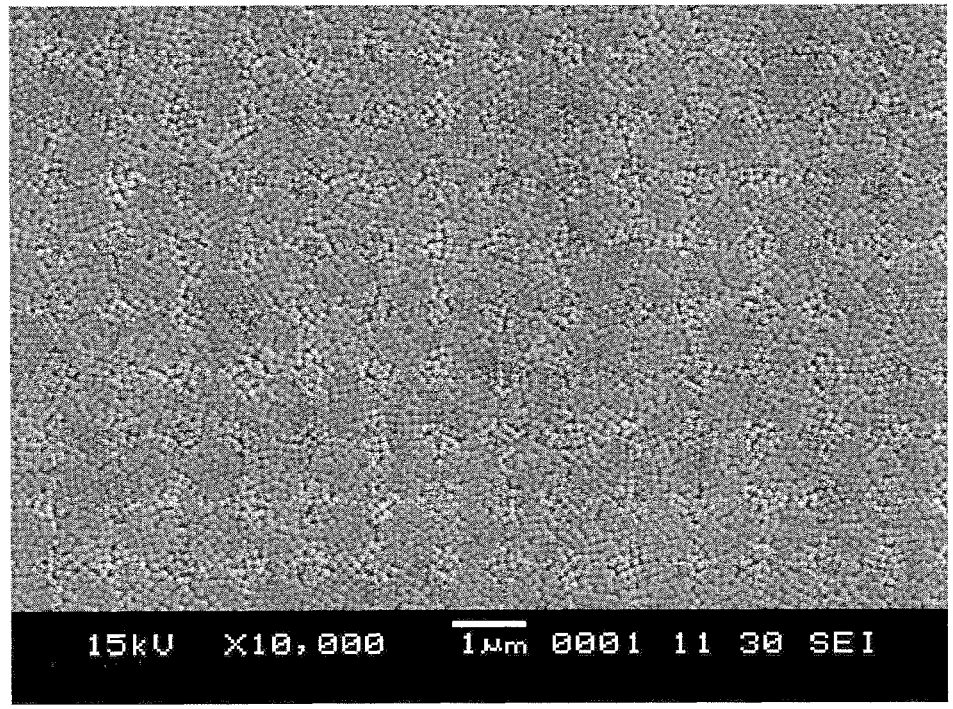
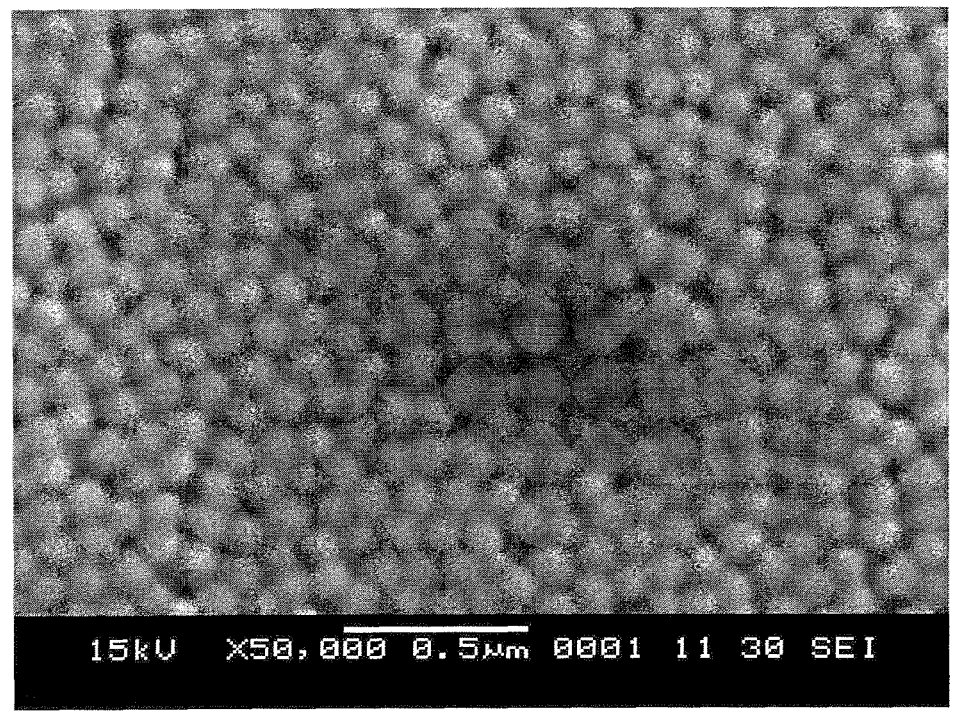

ELECTRON EMITTING ELEMENT AND METHOD FOR PRODUCING THE SAME

CROSS-REFERENCE TO RELATED APPLICATION

This application is related to Japanese Patent Application No. 2010-86069 filed on Apr. 2, 2010, whose priority is claimed and the disclosure of which is incorporated by reference in its entirety.

BACKGROUND OF THE INVENTION

1. Field of the Invention

The present invention relates to an electron emitting element for emitting electrons by application of a voltage and a method for producing the same.

2. Description of the Related Art

Conventionally, MIM (Metal Insulator Metal) type and MIS (Metal Insulator Semiconductor) type electron emitting elements have been known. These electron emitting elements are surface-emission-type electron emitting elements, each of which accelerate electrons by utilizing quantum size effect and an intense electric field in the element so that electrons are emitted from a flat surface of the element. These electron emitting elements do not require an intense electric field outside the elements, because the electrons accelerated in an electron acceleration layer in the elements are emitted to the outside. The MIM type and MIS type electron emitting elements can therefore overcome a problem of breakdown of the element by sputtering due to ionization of gas molecules and a problem of ozone generation, which are likely in the Spindt type, CNT (carbon nanotube) type and BN (boron nitride) type electron emitting elements.

In addition, there has been developed an electron emitting element that is capable of stable electron emission in the atmosphere and inhibited from generating harmful substances such as ozone and NOx when emitting electrons. For example, there has been known an electron emitting element including, between electrodes, an electron acceleration layer containing: conductive fine particles composed of an electrical conductor and having a potent antioxidative effect; and an insulating material having a size larger than the size of the conductive fine particles (for example, Japanese Unexamined Patent Publication No. 2009-146891).

However, the above-described electron emitting element has been desired to be improved in electric power consumption, because the current in the element tends to be increased as the amount of electrons being emitted from the element is increased.

SUMMARY OF THE INVENTION

In view of the above-described circumstances, the present invention has been achieved to provide an electron emitting element that consumes less electric power and emits electrons efficiently.

According to an aspect of the present invention, there is provided an electron emitting element, comprising: a first electrode; an insulating fine particle layer formed on the first electrode and composed of insulating fine particles; and a second electrode formed on the insulating fine particle layer, wherein the insulating fine particles are monodisperse fine particles, and when a voltage is applied between the first electrode and the second electrode, electrons are discharged from the first electrode into the insulating fine particle layer and accelerated through the insulating fine particle layer to be emitted from the second electrode.

The inventors of the present invention made intensive studies to achieve the above-described object. As a result, the inventors of the present invention found that an electron emitting element could be improved in electric power consumption and electron emission efficiency when insulating fine particles forming a layer between electrodes are monodisperse fine particles and therefore the layer is uniformly filled with the fine particles, to reach completion of the present invention. The present invention can provide an electron emitting element that consumes less electric power and emits electrons efficiently.

BRIEF DESCRIPTION OF THE DRAWINGS

FIG. 3 is a drawing showing an SEM image of a surface of the insulating fine particle layer of Example 1;

FIG. 12 is a drawing illustrating an example of a light emitting device including an electron emitting element of the present invention;

FIG. 13 is a drawing illustrating another example of the light emitting device including an electron emitting element of the present invention;

DESCRIPTION OF THE PREFERRED EMBODIMENTS

Figure 1:
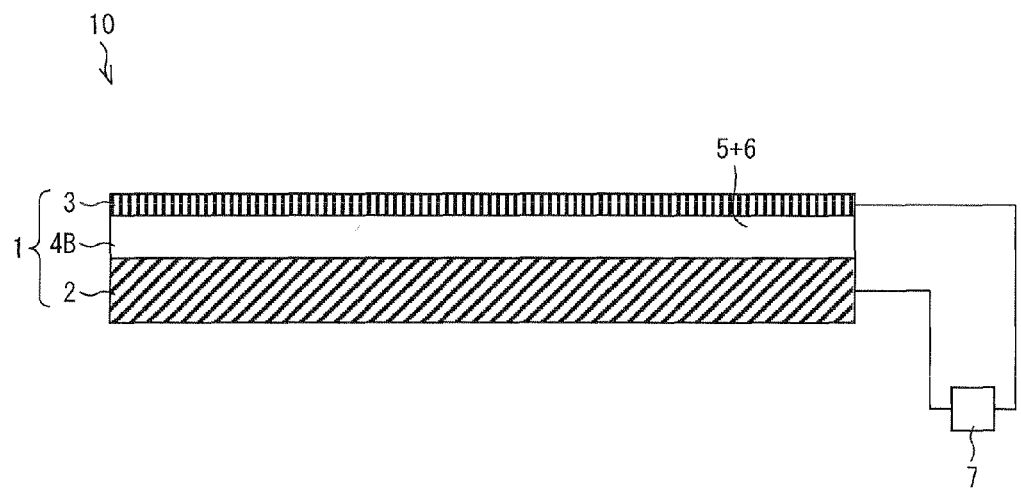
FIG. 1 is a schematic view illustrating a configuration of an electron emitting element according to Embodiment 1 of the present invention.

An electron emitting element of the present invention comprises: a first electrode; an insulating fine particle layer formed on the first electrode and composed of insulating fine particles; and a second electrode formed on the insulating fine particle layer, wherein the insulating fine particles are monodisperse fine particles, and when a voltage is applied between the first electrode and the second electrode, electrons are discharged from the first electrode into the insulating fine particle layer and accelerated through the insulating fine particle layer to be emitted from the second electrode.

Since the insulating fine particle layer is composed of insulating fine particles, and the insulating fine particles are monodisperse fine particles in the present invention, the insulating fine particle layer is less likely to have a defect and roughness on its surface. Accordingly, it is possible to provide an electron emitting element that emits an increased amount of electrons while lessening the amount of the current in the element. It is therefore possible to provide an electron emitting element that consumes less electric power and emits electrons efficiently.

In addition, since the insulating fine particles are monodisperse fine particles in the present invention, the insulating fine particle layer may be formed by being filled closely with the insulating fine particles.

Preferably, monodisperse fine particles account for 80% or more of the particle diameter distribution based on volume of the insulating fine particles.

In the present invention, the monodisperse fine particles mean spherical particles being uniform in particle diameter and shape; specific criteria in terms of the particle diameter and the shape thereof will be described below.

That is, in terms of the particle diameter, the monodisperse fine particles have a coefficient of variation (hereinafter, simply referred to as CV in the present specification) of 10% or less, when the coefficient of variation is defined as the ratio of the standard deviation to the average of the particle diameters calculated based on volume (hereinafter, simply referred to as average particle diameter in the present specification) (standard deviation/average particle diameter).

In order to determine the average particle diameter and the standard deviation of the monodisperse fine particles, 500 fine particles extracted randomly are photographed with a scanning electron microscope, and the image obtained (SEM image) is processed and the circumferences of the particle outlines are each divided by the circular constant ($\pi$) to obtain conversion particle diameters, from which the average particle diameter based on volume and the standard deviation are calculated.

In terms of the shape, 500 fine particles extracted randomly are photographed with a scanning electron microscope, and the image obtained (SEM image) is processed to determine the length of the longest line between two points on each particle outline (longest diameter). The monodisperse fine particles are defined as particles in which 95% or more of the particles satisfy a ratio of the conversion particle diameter to the longest diameter of 0.9 or less.

In an embodiment of the present invention, in addition to the above-described configuration of the electron emitting element of the present invention, the insulating fine particle layer further contains conductive fine particles.

According to this embodiment, the insulating fine particle layer containing conductive fine particles functions as an electron acceleration layer for accelerating electrons between the electrodes, and the layer has semiconductivity. It is therefore possible to provide an electron emitting element that emits an increased amount of electrons while lessening the amount of the current in the element. Accordingly, it is possible to provide an electron emitting element that consumes less electric power and emits electrons efficiently.

In this embodiment, the conductive fine particles may be fine particles formed of a conductive material having a potent antioxidative effect.

Here, a material having a potent antioxidative effect means a material being less prone to an oxide formation reaction and having low reactivity. In general, according to a thermodynamic calculation, when a value of a change $\Delta G$ [kJ/mol] in free energy of oxide formation is negative and greater, the oxide formation reaction occurs more easily. In the present invention, a metal element whose $\Delta G$ is equal to or greater than −450 [kJ/mol] is considered the conductive fine material having a high resistance to oxidation. In addition, conductive fine particles to which such a conductive material is attached may be used as fine particles formed of a conductive material having a potent antioxidative effect. In addition, conductive fine particles coated with such a conductive material may be used as fine particles formed of a conductive material having a potent antioxidative effect.

Such a configuration can prevent deterioration of the electron emitting element due to oxidation by oxygen in the atmosphere, because the conductive fine particles are less prone to oxidization. It is therefore possible to provide an electron emitting element that is durable in the atmosphere and long-life.

The conductive fine particles may be fine particles containing at least one of gold, silver, platinum, palladium and nickel, for example.

In addition, an insulating material smaller than the size of the conductive fine particles may be present around the conductive fine particles.

According to the configuration, when a dispersion of the conductive fine particles coated with the insulating material is applied, the dispersibility in the dispersion can be improved. The conductive fine particles are therefore less likely to flocculate in the dispersion. In addition, since the conductive fine particles are less prone to oxidization, characteristic change in the electron emitting element is discouraged. It is therefore possible to prevent deterioration of the electron emitting element due to oxidation by oxygen in the atmosphere.

The insulating material may contain at least one of alcoholates, fatty acids and alkanethiols, for example.

The conductive fine particles may have an average particle diameter smaller than the insulating fine particles. For example, the conductive fine particles may have an average particle diameter of 3 nm to 20 nm.

Such a configuration discourages formation of a conductive path, and therefore the electron acceleration layer composed of the conductive fine particles and the insulating fine particles is less prone to dielectric breakdown.

Preferably, the insulating fine particle layer, that is, the insulating fine particle layer containing conductive fine particles has a film thickness of 8 nm to 3000 nm. More preferably, the insulating fine particle layer containing conductive fine particles has a film thickness of 30 nm to 1000 nm.

Such a configuration allows formation of a uniform insulating fine particle layer. In addition, the resistance of the insulating fine particle layer in the layer thickness direction can be easily adjusted. This allows electrons to be uniformly emitted from an entire surface of the electron emitting element and allows electrons to be efficiently emitted to the outside of the element.

In an embodiment of the present invention, the above-described configuration of the electron emitting element of the present invention further comprises a carbon film formed on the first electrode, wherein the insulating fine particle layer is formed on the carbon film.

Since the configuration of the electron emitting element of the present invention further comprises the carbon film formed on the first electrode, and the insulating fine particle layer is formed on the carbon film in this embodiment, the carbon film and the insulating fine particle layer function as an electron acceleration layer for accelerating electrons between the electrodes, and the layers have semiconductivity. It is therefore possible to provide an electron emitting element that emits an increased amount of electrons while lessening the amount of the current in the element. Accordingly, it is possible to provide an electron emitting element that consumes less electric power and emits electrons efficiently.

In this embodiment, preferably, the carbon film has a thickness of 5 nm to 300 nm. More preferably, the carbon film has a thickness of 10 nm to 100 nm.

According to the configuration, the carbon film can smoothen fine rough parts on the surface of the first electrode. It is therefore possible to uniformly move electrons on the carbon film to the insulating fine particles so that the electrons can be emitted from the entire electron emitting element uniformly.

Preferably, the insulating fine particle layer has a film thickness of 20 nm to 3000 nm. More preferably, the insulating fine particle layer has a thickness of 30 nm to 1000 nm.

Such a configuration allows formation of a uniform electron acceleration layer including the carbon film and the insulating fine particle layer. In addition, the resistance of the electron acceleration layer in the layer thickness direction can be easily adjusted. This allows electrons to be uniformly emitted from an entire surface of the electron emitting element and allows electrons to be efficiently emitted to the outside of the element.

In the electron emitting element of the present invention, the insulating fine particles may be fine particles containing at least one of $SiO_2$, $Al_2O_3$ and $TiO_2$.

Since the substances contained in the fine particles have high insulating properties, the resistance of the insulating fine particle layer composed of the insulating fine particles can be adjusted to any range.

The second electrode in the electron emitting element of the present invention may be formed of a material including at least one of gold, silver, carbon, tungsten, titanium, aluminum and palladium.

Having a lower work function, these substances to be included in the second electrode allows electrons having passed through the electron acceleration layer to tunnel efficiently. Accordingly, the electron emitting element can emit more high-energy electrons to the outside of the element.

Here the electron acceleration layer means the electron acceleration layer including the carbon film and the insulating fine particle layer or the electron acceleration layer being the insulating fine particle layer containing conductive fine particles.

Preferably, the insulating fine particles in the electron emitting element of the present invention have an average particle diameter of 5 nm to 1000 nm. More preferably, the insulating fine particles have an average particle diameter of 15 nm to 500 nm.

Such a configuration can effectively dissipate Joule heat generated by the current flowing through the electron emitting element to prevent the electron emitting element from being damaged by heat. Furthermore, such a configuration allows easy adjustment of the resistance in the electron acceleration layer (electron acceleration layer including the carbon film and the insulating fine particle layer or electron acceleration layer being the insulating fine particle layer containing conductive fine particles).

Further, it is possible to provide a light emitting device that is stable, long-life and capable of performing planar light emission by using an electron emitting element of the present invention in the light emitting device or in an image display device including the light emitting device.

Further, use of an electron emitting element of the present invention in an air blowing device or a cooling device enables high-efficiency cooling without experiencing electric discharge and generation of harmful substances such as ozone and NOx by utilizing slip effect on a surface of an object being cooled.

Further, use of an electron emitting element of the present invention in a charging device and an image forming apparatus including the charging device enables stable charging of an object for a longer time without experiencing electric discharge and generation of harmful substances such as ozone and NOx.

Further, use of an electron emitting element of the present invention in an electron-beam curing device enables area-by-area electron-beam curing and achievement of a maskless process, thereby achieving low cost and high throughput.

In addition, an electron emitting element of the present invention may be used in an electron emitting device. That is, the present invention may be an electron emitting device comprising any one of the above-described electron emitting elements and a power supply for applying a voltage between the first electrode and the second electrode. The power supply may be a direct-current power supply with the first electrode as a negative electrode. Since an electron emitting element that can emit a sufficient amount of electrons by application of a moderate voltage and can continuously operate for a longer time is used, it is possible to provide an electron emitting device capable of stable electron emission.

These devices, that is, the light emitting device, the image display device, the air blowing device, the cooling device, the charging device, the image forming apparatus, the electron-beam curing device and the electron emitting device may include a plurality of electron emitting elements. For example, a plurality of electron emitting elements may be arranged on a planar body to be applied to these devices. In addition, a plurality of electron emitting elements may share a first electrode to be applied to these devices.

According to another aspect of the present invention, there is provided a method for producing an electron emitting element, the electron emitting element comprising: a first electrode; an insulating fine particle layer formed on the first electrode and composed of insulating fine particles; and a second electrode formed on the insulating fine particle layer, wherein the insulating fine particles are monodisperse fine particles, and when a voltage is applied between the first electrode and the second electrode, electrons emitted from the first electrode are accelerated in the insulating fine particle layer to be emitted from the second electrode, the method comprising the steps of: forming the insulating fine particle layer by applying a dispersion of the monodisperse insulating fine particles onto the first electrode; and forming the electrode on the insulating fine particle layer.

According to the aspect of the present invention, it is possible to produce an electron emitting element in which the insulating fine particle layer is composed of insulating fine particles, and the insulating fine particles are monodisperse fine particles. It is therefore possible to provide a method for producing an electron emitting element that emits an increased amount of electrons while lessening the amount of the current in the element. It is therefore possible to provide a method for producing an electron emitting element that consumes less electric power and emits electrons efficiently.

In an embodiment of the present invention, the above-described production method of the present invention may further comprise the step of forming the insulating fine particle layer so as to contain conductive fine particles by applying a dispersion of the conductive fine particles onto the insulating fine particle layer, and the step of forming the electrode may be the step of forming the electrode on the insulating fine particle layer containing the conductive fine particles. For example, the step of forming the insulating fine particle layer may be the step of applying a dispersion obtained by dispersing the insulating fine particles in water, and the step of forming the insulating fine particle layer so as to contain conductive fine particles may be the step of applying a dispersion obtained by dispersing the conductive fine particles in a solvent.

According to this embodiment, it is possible to produce an electron emitting element including the insulating fine particle layer containing the conductive fine particles. It is therefore possible to provide a method for producing an electron emitting element that emits an increased amount of electrons while lessening the amount of the current in the element. It is therefore possible to provide a method for producing an electron emitting element that consumes less electric power and emits electrons efficiently.

In an embodiment of the present invention, the above-described production method of the present invention may further comprise the step of forming a carbon film on the first electrode, and the step of forming the insulating fine particle layer may be the step of forming the insulating fine particle layer by applying a dispersion of the monodisperse insulating fine particles onto the carbon film.

According to this embodiment, it is possible to provide an electron emitting element in which the carbon film is formed on the first electrode, and the insulating fine particle layer is formed on the carbon film. It is therefore possible to provide a method for producing an electron emitting element that emits an increased amount of electrons while lessening the amount of the current in the element. It is therefore possible to provide a method for producing an electron emitting element that consumes less electric power and emits electrons efficiently.

In method for producing an electron emitting element of the present invention, the step of forming the insulating fine particle layer may be the step of applying the dispersion by a spin coating method. Since the spin coating method allows the dispersion to be easily applied to a wide range, it is possible to produce a device capable of wide-range electron emission.

The first electrode is a conductor or a semiconductor for applying a voltage to the insulating fine particle layer, and may be a single structure or a structure consisting of a plurality of structures. For example, the first electrode may be a metal plate or a metal film formed on an insulator (such as an aluminum film formed on a glass substrate). The first electrode includes a so-called electrode substrate.

Hereinafter, embodiments and examples of the present invention will be described in detail with reference to FIG. 1 to FIG. 18. It should be noted that the following embodiments and examples are merely concrete examples of the present invention and the present invention is not limited to the following embodiments and examples.

Embodiment 1

FIG. 1 is a schematic view illustrating a configuration of an electron emitting element according to an embodiment of the present invention. As illustrated in FIG. 1, an electron emitting element 1 according to this embodiment comprises: an electrode substrate 2; an electron acceleration layer 4 formed on the electrode substrate 2 for accelerating electrons provided from the electrode substrate 2; and a thin-film electrode 3 formed on the electron acceleration layer 4 and opposite the electrode substrate 2. When a voltage is applied between the electrode substrate 2 and the thin-film electrode 3, the electron emitting element 1 accelerates electrons provided from the electrode substrate 2 in the electron acceleration layer 4 to emit them from the thin-film electrode 3. That is, a current flows through the electron acceleration layer 4 between the electrode substrate 2 and the thin-film electrode 3, and some of electrons in the current become ballistic electrons due to an intense electric field formed by the applied voltage to be emitted from the electron acceleration layer 4 and then emitted from the thin-film electrode 3 to the outside of the element. The electrons emitted from the electron acceleration layer 4 pass (transmit) through the thin-film electrode 3, or pass through holes (gaps) in the thin-film electrode 3 under the thin-film electrode 3 generated due to roughness in the surface of the electron acceleration layer 4 to be emitted to the outside.

The electrode substrate 2 is an electrode also serving as a substrate and composed of a plate-like material formed from a conductor. Specifically, it is composed of a plate-like material formed from a stainless used steel (SUS). Functioning as an electrode as well as a support of the electron emitting element, the electrode substrate 2 preferably has a certain level of strength and appropriate conductivity. Other than the stainless used steel (SUS), for example, a substrate formed from a metal such as SUS, Ti and Cu; and a substrates of a semiconductor such as Si, Ge and GaAs may be used.

Alternatively, the electrode substrate 2 may be a structure obtained by forming an electrode made of a metal film on an insulating substrate such as a glass substrate or a plastic substrate. When an insulating substrate such as a glass substrate is used, for example, a surface of the insulating substrate to be the interface with the electron acceleration layer 4 is coated with a conductive material such as a metal may be used as the electrode substrate 2. Any kind of conductive material may be used for the electrode, as long as magnetron sputtering can be used for the conductive material. When stable operation in the atmosphere is desired, however, conductive materials having high resistance to oxidation are preferably used, and noble metals are more preferably used. ITO is also useful for the conductive material as being an electrically conductive oxide material which is widely used for a transparent electrode. Further, a plurality of conductive materials may be used to coat the insulating substrate in order to form a tough thin film. For example, a metal thin film obtained by forming a Ti film having a thickness of 200 nm and further forming a Cu film having a thickness of 1000 nm on a surface of a glass substrate may be used as the electrode substrate 2. By coating a glass substrate with such a Ti thin film and a Cu thin film, a tough thin film can be formed. When a surface of the insulating substrate is coated with a conductive material, a pattern in a rectangle shape or the like may be formed by well-known photolithography or masking to form an electrode. While the conductive material and the thickness of the thin film are not particularly limited, the electrode substrate 2 should have good adhesiveness with structures including the electron acceleration layer to be formed thereon as described below.

The thin-film electrode 3 is formed on the electron acceleration layer 4 and opposite the electrode substrate 2. The thin-film electrode 3 is an electrode that forms a pair with the electrode substrate 2 and that, together with the electrode substrate 2, is used for applying a voltage to the inside of the electron acceleration layer 4. Accordingly, the material thereof is not particularly limited as long as it has conductivity to the extent that it can function as an electrode. In particular, a material which has a low work function and from which a thin-film can be formed is expected to provide a greater effect, because the thin-film electrode 3 is also an electrode that transmits and emits, with a minimum energy loss, electrons caused to have higher energy due to the acceleration within the electron acceleration layer 4. Examples of such a material include: gold, silver, tungsten, titanium, aluminum and palladium each of which has a work function in a range of 4 eV to 5 eV. In particular, in consideration of operation under an atmospheric pressure, gold is the best material, which is free from oxide or sulfide formation reaction. Further, silver, palladium and tungsten, each of which has a relatively small oxide formation reaction, are also applicable materials that can be used without any problem.

The film thickness of the thin-film electrode 3 is important as a condition for efficiently emitting electrons from the electron emitting element 1 to the outside of the element. It is therefore preferable that the film thickness of the thin-film electrode 3 is in a range of 10 nm to 55 nm. The minimum film thickness of the thin-film electrode 3 is 10 nm for causing the thin-film electrode 3 to function as a planar electrode. A film thickness of less than 10 nm cannot ensure electrical conduction. On the other hand, the maximum film thickness of the thin-film electrode 3 is 55 nm for emitting electrons from the electron emitting element 1 to the outside. When the film thickness is more than 55 nm, ballistic electrons do not pass thorough the thin-film electrode 3, and the ballistic electrons are absorbed by the thin-film electrode 3 or reflected back on the thin-film electrode 3 to be recaptured in the electron acceleration layer 4.

The electron acceleration layer 4 is formed on the electrode substrate 2 as a layer covering the electrode. As illustrated in FIG. 1, the electron acceleration layer 4 is formed of an insulating fine particle layer 4B composed of insulating fine particles 5, and the insulating fine particle layer 4B contains conductive fine particles 6. That is, the insulating fine particle layer 4B, which is the electron acceleration layer 4, is composed of the insulating fine particles 5 and the conductive fine particles 6.

The insulating fine particle layer 4B is formed on the electrode substrate 2 and composed of the insulating fine particles 5. Since the insulating fine particles 5 are monodisperse fine particles, the insulating fine particle layer 4B is filled with the insulating fine particles 5 uniformly.

The insulating fine particles 5 are monodisperse fine particles. Preferably, monodisperse fine particles account for 80% or more of the particle diameter distribution based on volume of the insulating fine particles.

In the present invention, the monodisperse fine particles mean spherical particles being uniform in particle diameter and shape; specific criteria in terms of the particle diameter and the shape thereof will be described below.

That is, in terms of the particle diameter, the monodisperse fine particles have a coefficient of variation (hereinafter, simply referred to as CV in the present specification) of 10% or less, when the coefficient of variation is defined as the ratio of the standard deviation to the average of the particle diameters calculated based on volume (hereinafter, simply referred to as average particle diameter in the present specification) (standard deviation/average particle diameter).

In order to determine the average particle diameter and the standard deviation of the monodisperse fine particles, 500 fine particles extracted randomly are photographed with a scanning electron microscope, and the image obtained (SEM image) is processed and the circumferences of the particle outlines are each divided by the circular constant ($\pi$) to obtain conversion particle diameters, from which the average particle diameter based on volume and the standard deviation are calculated.

In terms of the shape, 500 fine particles extracted randomly are photographed with a scanning electron microscope, and the image obtained (SEM image) is processed to determine the length of the longest line between two points on each particle outline (longest diameter). The monodisperse fine particles are defined as particles in which 95% or more of the particles satisfy a ratio of the conversion particle diameter to the longest diameter of 0.9 or less.

Examples of the insulating fine particle 5 as such monodisperse fine particles include colloidal silica MP-1040 manufactured by Nissan Chemical Industries, Ltd. (average particle diameter: 100 nm, 40 wt %). Other than that, colloidal silica, MP-4540 (average particle diameter: 450 nm, 40 wt %), MP-3040 (average particle diameter: 300 nm, 40 wt %), SNOWTEX-20 (average particle diameter: 15 nm, 20 wt %), SNOWTEX-SX (average particle diameter: 5 nm, 20 wt %), all manufactured by Nissan Chemical Industries, Ltd., may be used.

The insulating fine particles 5 may be rod-shaped particles, for example, as long as they include monodisperse fine particles being highly uniform in shape. Rod-shaped particles may be used as long as the particle diameters and the lengths thereof are to satisfy the above-described CV.

The insulating fine particles 5 are composed of fine particles, that is, mainly of nanosized particles. Preferably, the insulating fine particles 5 have an average particle diameter of 5 nm to 1000 nm. More preferably, the insulating fine particles 5 have an average particle diameter of 15 nm to 500 nm. The insulating fine particles 5 having an average particle diameter within these numerical ranges are preferably used, because in this case the resistance of the insulating fine particle layer 4B can be adjusted easily. Having such insulating fine particles 5, the electron emitting element can be prevented from being damaged by heat, because Joule heat generated by the current flowing through the electron emitting element when the element is in operation is effectively dissipated. Thus, the insulating fine particle 5 having an average particle diameter within the above-described numerical ranges are preferable.

The insulating fine particles 5 are formed from a material having insulating properties, and practical examples of the material include insulators such as $SiO_2$, $Al_2O_3$ and $TiO_2$. More specifically, colloidal silica manufactured and marketed by Nissan Chemical Industries, Ltd. may be used, for example.

The insulating fine particle layer 4B contains the conductive fine particles 6, and the conductive fine particles 6 are interposed among the insulating fine particles 5 that fill the layer uniformly. The conductive fine particles 6 are composed of fine particles formed from a conductive material having a high antioxidative effect.

Fine particles are used for the conductive fine particles 6 as in the case of the insulating fine particles 5. In order to control the conductivity of the insulating fine particle layer 4B, the conductive fine particles 6 need to be fine particles having an average particle diameter smaller than the average particle diameter of the insulating fine particles 5. It is therefore preferable that the conductive fine particles 6 have an average particle diameter of 3 nm to 20 nm. When the average particle diameter of the conductive fine particles 6 is smaller than the average particle diameter of the insulating fine particles 5, a conductive path will not be formed by the conductive fine particles 6 in the electron acceleration layer 4 to lessen occurrence of dielectric breakdown in the electron acceleration layer 4. Though there are a lot of unexplained points in regard to a principle, ballistic electrons are efficiently generated by use of the conductive fine particles 6 having an average particle diameter within the above-described range.

In terms of the principle of the action of generating ballistic electrons, the material of the conductive fine particles 6 may be any kind of conductive material. It is however preferable that the conductive fine particles 6 are formed from a conductive material such as gold, silver, platinum, palladium and nickel, for example, because they need to be formed from a conductive material having a high antioxidative effect in order to prevent oxidation degradation when the element operates in the atmosphere. The conductive fine particles 6 can be produced by using a known fine particle production method such as a sputtering method or a spray heating method. Alternatively, commercially available metal fine particle powders may be used, such as silver nanoparticles manufactured and marketed by Ouyou Nano Laboratory K.K.

The insulating fine particle layer 4B contains an insulating material, and the conductive fine particles 6 may be coated with the insulating material. For example, a small insulating structure formed of an insulating material and having a size smaller than the size of the conductive fine particles 6 may attach to the conductive fine particles 6 so as to partially or entirely cover the surfaces of the particles. The small insulating structure may be an aggregate of particles having an average particle diameter smaller than the average particle diameter of the conductive fine particles 6 or an insulating film to coat the surfaces of the conductive fine particles 6. Alternatively, it may be a film formed by oxidation of a conductive material on the surfaces of the conductive fine particles (hereinafter, referred to as oxide film). In terms of the principle of the action of the insulating fine particle layer 4B to function as an electron acceleration layer and generate ballistic electrons, any kind of insulating material may be used for the insulating material that forms the small insulating structure. When the small insulating structure is an oxide film formed on the surfaces of the conductive fine particles, however, the oxide film may have a film thickness larger than a desired film thickness due to oxidation degradation in the atmosphere. In order to avoid influence by such degradation, the small insulating structure may be an organic film (insulating film formed from an organic material) formed on the surfaces of the conductive fine particles. Examples thereof include a film formed from a material such as an alcoholate, a fatty acid and an alkanethiol. A thinner film is more advantageous.

The Insulating fine particle layer 4B containing the conductive fine particles 6 functions as an electron acceleration layer for accelerating electrons provided from the electrode substrate 2 when a voltage is applied to the electrode substrate 2. Since it is preferable for the electron emitting element 1 to accelerate electrons by application of an intense electric field at a voltage as low as possible, the electron acceleration layer 4 preferably has a thickness as small as possible. Specifically, the electron acceleration layer 4 preferably has a thickness of 8 nm to 3000 nm. Thereby, the electron acceleration layer 4 can be formed to have a uniform thickness and adjustment of the electric resistance in a direction of the layer thickness of the electron acceleration layer will be easy. More preferably, the electron acceleration layer 4 has a thickness of 30 nm to 1000 nm. Thereby, the electron acceleration layer can be formed to have a more uniform thickness and adjustment of the electric resistance in the direction of the layer thickness of the electron acceleration layer will be easier. As a result, electrons can be emitted uniformly over the entire surface of the electron emitting element, so that the electrons can be emitted from the thin-film electrode of the electron emitting element efficiently.

Here, the effect of the insulating fine particle layer 4B containing the conductive including fine particles 6, that is, the electron acceleration layer 4 will be described. When a voltage is applied between the electrode substrate 2 and the thin-film electrode 3, electrons moves from the electrode substrate 2 to the surfaces of the insulating fine particles in the electron acceleration layer 4 provided between the electrode substrate 2 and the thin-film electrode 3. Since the resistance inside of the insulating fine particles is high, the electrons are conducted through the surfaces of the insulating fine particles. On this occasion, the electrons are trapped at impurities and a surface preparation agent on the surfaces of the insulating fine particles or points of contact among the insulating fine particles. The conductive fine particles in the insulating fine particle layer 4B help the trapped electrons move to a lower part of the thin-film electrode 3. In the lower part of the thin-film electrode 3, the applied voltage together with an electric field formed by the trapped electrons form an intense electric field, and the electrons are accelerated by the intense electric field to be emitted from the thin-film electrode 3.

On the other hand, since the insulating fine particle layer 4B is composed of the insulating fine particles being monodisperse fine particles and filled with the fine particles uniformly, points of contact among the insulating fine particles are uniformly distributed in the insulating fine particle layer 4B, and conductive paths through which electrons are conducted will also be uniformly distributed. It is therefore possible to conduct electrons while efficiently trapping the electrons. As a result, more ballistic electrons are generated so that a large amount of electrons are emitted from the thin-film electrode 3.

Because of the above-described effect, the electron emitting element of the present embodiment emits an increased amount of electrons while lessening the amount of the current in the element.

In use of the electron emitting element, the electrode substrate 2 and the thin-film electrode 3 are connected to a power supply 7. As illustrated in FIG. 1, an electron emitting device 10 may be formed to include the electron emitting element 1, and the power supply 7 connected to the electrode substrate 2 and the thin-film electrode 3.

Production Method

Next, a method for producing the electron emitting element 1 according to Embodiment 1 will be described.

First, a dispersion of insulating fine particles obtained by dispersing the monodisperse insulating fine particles 5 in water is prepared. The concentration of the insulating fine particles 5 in the dispersion is preferably 10 wt % or more and 50 wt % or less. When the concentration is less than 10 wt %, the surface of the electrode substrate cannot be filled with the insulating fine particles 5. On the other hand, when the concentration is more than 50 wt %, the viscosity of the dispersion increases to cause flocculation, preventing formation of a thin film. Examples of the dispersion of monodisperse insulating fine particles include colloidal silica, MP-4540 (average particle diameter: 450 nm, 40 wt %), MP-3040 (average particle diameter: 300 nm, 40 wt %), MP-1040 (average particle diameter: 100 nm, 40 wt %), SNOWTEX-20 (average particle diameter: 15 nm, 20 wt %) and SNOWTEX-SX (average particle diameter: 5 nm, 20 wt %) manufactured by Nissan Chemical Industries, Ltd., which are dispersions of hydrophilic silica.

In addition, a dispersion of conductive fine particles containing the conductive fine particles 6 is prepared. As the dispersion of conductive fine particles, the conductive fine particles 6 may be dispersed in a dispersion solvent, or a commercially available product may be used. The dispersing method is not particularly limited, and examples thereof include a dispersing method performed at normal temperature using an ultrasonic disperser. As the solvent for the dispersion, an organic solvent having high hydrophobic properties and low polarity is preferably used. Since the above-described insulating fine particles 5 are hydrophilic, use of such a solvent prevents dissolution of the insulating fine particle layer uniformly filled with the hydrophilic insulating fine particles. Examples of the organic solvent include toluene, benzene, xylene and hexane.

In order to improve the dispersibility, the conductive fine particles 6 may be surface-treated. When the conductive fine particles 6 are surface-treated, a suitable dispersion solvent is selected according to the surface treatment. For example, for the conductive fine particles 6 surface-treated with an alcoholate, toluene or hexane is preferable.

In addition, a colloidal solution of nanosized conductive fine particles 6 in a liquid state may be used as the dispersion of conductive fine particles. When the colloidal solution of nanosized conductive fine particles 6 is used in a liquid state, the conductive fine particles 6 do not flocculate to allow application of a dispersion in which the conductive fine particles 6 are uniformly dispersed. Examples of the colloidal solution of nanosized conductive fine particles 6 include a colloidal solution of gold nanoparticles manufactured and marketed by Harima Chemicals, Inc., silver nanoparticles manufactured and marketed by Ouyou Nano Laboratory K.K., a colloidal solution of platinum nanoparticles and a colloidal solution of palladium nanoparticles manufactured and marketed by Tokuriki Chemical Research Co., Ltd., and a paste of nickel nanoparticles manufactured and marketed by IOX. CO., LTD.

Subsequently, the dispersion of insulating fine particles prepared is applied onto the electrode substrate 2 by a spin coating method to form an insulating fine particle layer. When the electrode substrate is formed from aluminum or a stainless steel and the surface of the electrode substrate is hydrophobic, for example, the dispersion of hydrophilic silica will be repelled, and therefore the surface of the electrode substrate is subjected to a hydrophilic treatment. The hydrophilic treatment is not particularly limited, and in the case of a UV treatment, for example, the surface of the electrode substrate is irradiated with UV under vacuum of 20 Pa for 10 minutes.

The condition for the spin coating of the dispersion is not particularly limited; for example, after the dispersion prepared is applied onto the electrode substrate 2, the electrode substrate 2 is spun at a spin speed of 500 rpm for 5 seconds, and then the electrode substrate is spun at a spin speed of 3000 rpm to 4500 rpm for 10 seconds. The amount of the dispersion being applied onto the electrode substrate is not particularly limited; for example, it is 0.2 mL/cm$^2$ or more when applied to a 24-millimeter-square electrode substrate.

After the application by the spin coating method, the electrode substrate 2 with the dispersion is dried. The insulating fine particle layer 4B formed as described above will be filled with the insulating fine particles uniformly.

Subsequently, the dispersion of conductive fine particles prepared is applied onto the insulating fine particle layer by a spin coating method so that the insulating fine particle layer 4B contains the conductive fine particles. Following the application of the dispersion of conductive fine particles onto the insulating fine particle layer, the conductive fine particles enter the inside of the insulating fine particle layer and, as a result, the insulating fine particle layer 4B containing the conductive fine particles is formed. The condition for the spin coating is not particularly limited. After the application, the dispersion of conductive fine particles is dried as in the case of the application of the dispersion of insulating fine particles.

Subsequently, the thin-film electrode 3 is formed on the insulating fine particle layer 4B containing the conductive fine particles. For forming the thin-film electrode 3, a magnetron sputtering method may be used, for example. The thin-film electrode 3 may be formed by an inkjet method, a spin coating method or a vapor deposition method, for example. Thus, the electron emitting element according to Embodiment 1 is completed.

Though the description is on the assumption that the insulating fine particle layer 4B containing the conductive fine particles is formed by a spin coating method, a dropping method, a spray coating method, a spray method and an inkjet method may be used other than the spin coating method, for example. The application by the spin coating method or another method and drying may be repeated so that the insulating fine particle layer 4B having a desired film thickness is formed.

Example 1

Hereinafter, an example of the electron emitting element of the present invention will be described.

A 25 mm×25 mm ITO substrate was used as the electrode substrate 2 and irradiated with UV under vacuum of 20 Pa for 10 minutes.

Next, 2 mL of colloidal silica MP-1040 manufactured by Nissan Chemical Industries, Ltd., wherein the monodisperse particles accounting for 80% of the volume distribution have an average particle diameter of 117 nm, a standard deviation of 0.26 nm and a CV of 0.22%, as the insulating fine particles was applied dropwise onto the electrode substrate, and the substrate was spun by a spin coating method at spin speeds raised from 0 rpm to 3000 rpm over 5 seconds, and further spun at 3000 rpm for 10 seconds. Thus, an insulating fine particle layer was formed.

Figure 2:
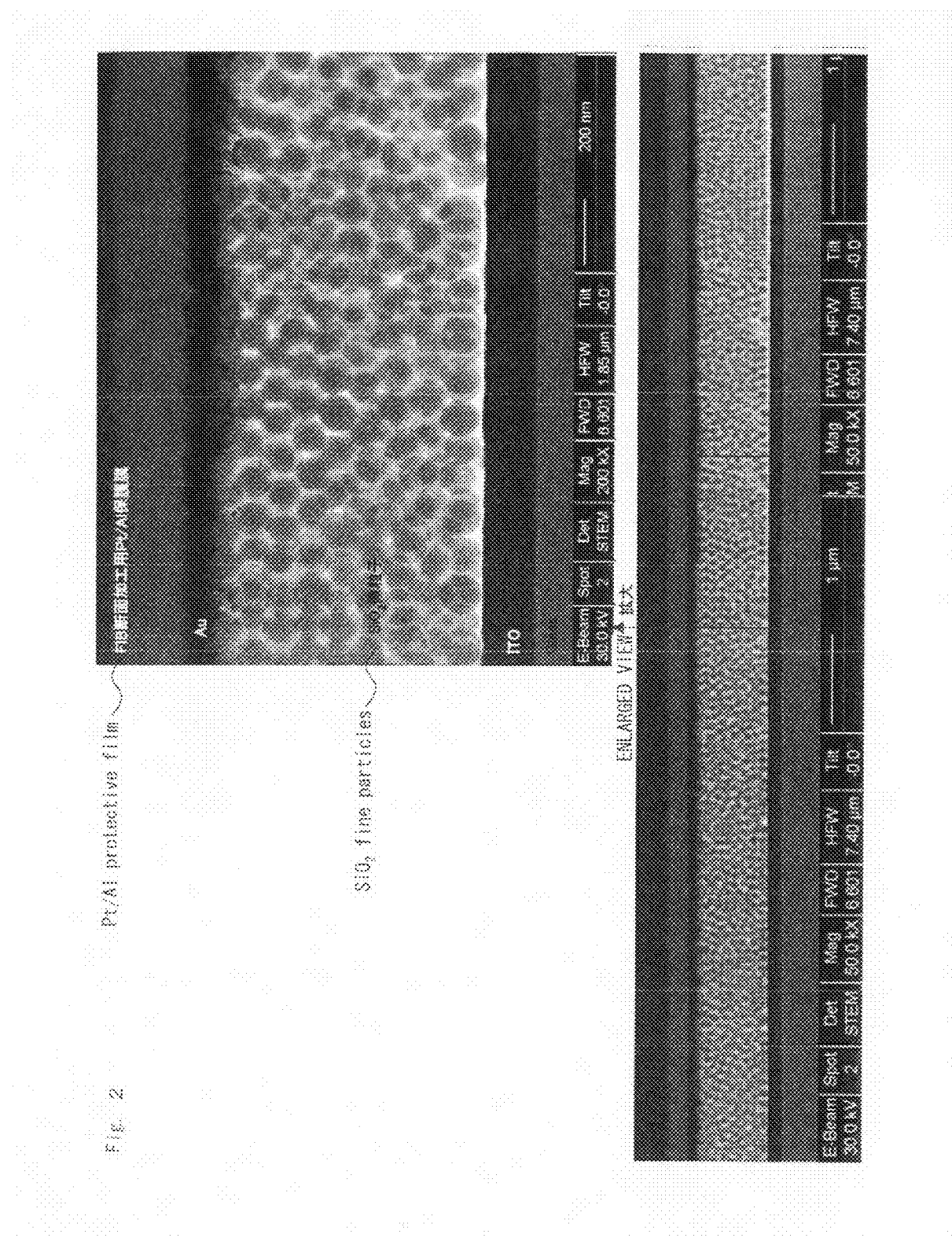
FIG. 2 is a drawing showing an SEM image of a cross section of an insulating fine particle layer of Example 1.

FIG. 2 shows an SEM image of a cross section of the insulating fine particle layer of Example 1, and FIG. 3 shows an SEM image of a surface of the insulating fine particle layer of Example 1. FIG. 2 and FIG. 3 confirm that the insulating fine particle layer is filled with the monodisperse insulating fine particles in lines.

Next, 3.0 g of toluene solvent and, as conductive fine particles, 0.5 g of silver nanoparticles having an average diameter of 10 nm manufactured by Ouyou Nano Laboratory K.K. Co., Ltd. were put into a reagent bottle, and the reagent bottle was applied to an ultrasonic disperser for 5 minutes to prepare a dispersion of the conductive fine particles.

Then, the dispersion of the conductive fine particles was applied dropwise onto the insulating fine particle layer obtained as described above, and spun by a spin coating method at spin speeds raised from 0 rpm to 3000 rpm over 5 seconds, and further spun at 3000 rpm for 10 seconds. Thus, an electron acceleration layer 4 filled with the monodisperse insulating fine particles in lines and containing the conductive fine particles was obtained. The film thickness of the electron acceleration layer 4 was 770 nm.

Then, the thin-film electrode 3 was formed on a surface of the electron acceleration layer 4 with a magnetron sputtering apparatus to obtain the electron emitting element of Example 1. Gold was used as the material of the film formed as the thin-film electrode 3, the thickness of the thin-film electrode 3 was 40 nm, and the area of the thin-film electrode 3 was 0.01 cm$^2$.

Figure 4:
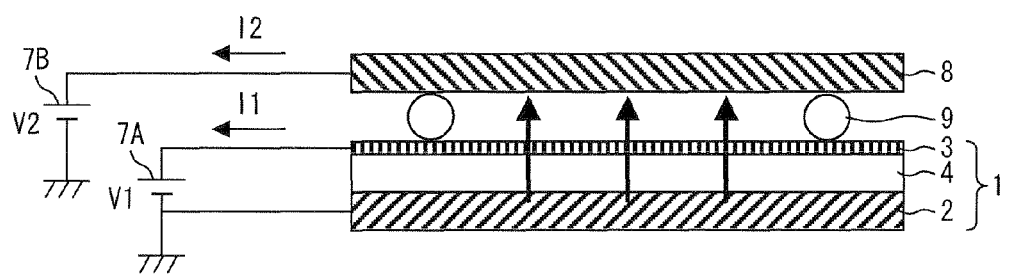
FIG. 4 is a drawing illustrating a measurement system for an electron emission experiment.

A measurement system illustrated in FIG. 4 was set up in vacuum at $1 \times 10^{-8}$ ATM, and an electron emission experiment was performed to study the electron emitting element 1 of Example 1 produced as described above for electron emission characteristics.

In the measurement system in FIG. 4, a counter electrode 8 was disposed on a side of the thin-film electrode 3 of the electron emitting element 1 in such a manner that the counter electrode 8 and the thin-film electrode 3 had an insulating spacer 9 (diameter: 1 mm) therebetween. A power supply 7A was provided to apply a voltage V1 between the electrode substrate 2 and the thin-film electrode 3 of the electron emitting element 1, and a power supply 7B was provided to apply a voltage V2 to the counter electrode 8. An in-element current I1, which flowed between the thin-film electrode 3 and the power supply 7A, per unit area (current density in the element) and an electron emission current I2, which flowed between the counter electrode 8 and the power supply 7B, per unit area (electron emission current density) were measured.

Figure 5:
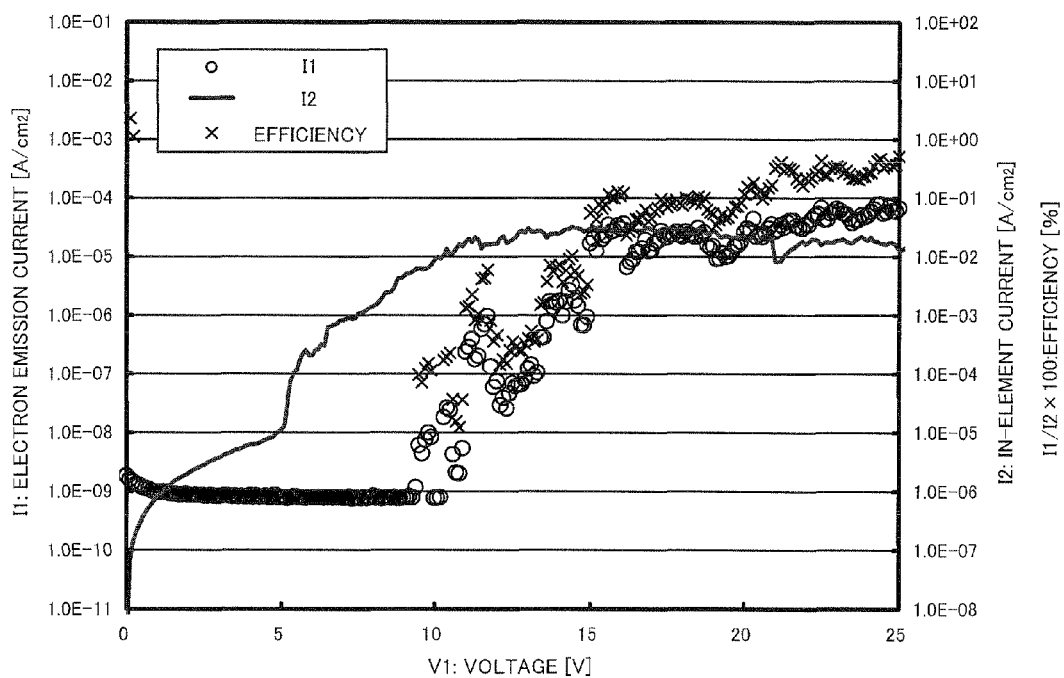
FIG. 5 is a drawing illustrating a result (VI characteristics) of an electron emitting element of Example 1 measured for the electron emission current and the in-element current.

When the voltage V1 applied to the thin-film electrode 3 was 24.4 V and the voltage V2 applied to the counter electrode 8 was 100 V, it was confirmed that the in-element current I1 per unit area was 0.0171 A/cm$^2$, the electron emission current I2 per unit area was 0.0806 m A/cm$^2$ and the element efficiency was 0.47%. FIG. 5 shows result of the measurement.

Comparative Example 1

As a comparative example, an electron emitting element was produced according to the patent application (Japanese Patent Application No. 2008-295722) that the applicant of the present application applied prior to the present application. As in the case of Example 1, the measurement system illustrated in FIG. 4 was used in the measurement for the electron emission characteristics. That is, the electron emission experiment was performed in vacuum at $1 \times 10^{-8}$ ATM to study the element for the electron emission characteristics.

The comparative example was prepared as follows. That is, 3 mL of toluene solvent and, as the insulating fine particles 5, 0.5 g of spherical silica particles having an average diameter of 110 nm were put into a 10-mL reagent bottle, and the reagent bottle was applied to an ultrasonic disperser to prepare a dispersion (C) of the insulating fine particles.

Next, 0.026 g of silver nanoparticles (average diameter: 10 nm, insulating coating with alcoholate: 1 nm, product by Ouyou Nano Laboratory K.K.) as metal fine particles was added to the dispersion (C), and the reagent bottle was applied to an ultrasonic disperser to prepare a mixture (D) of the insulating fine particles 5 and the silver nanoparticles. In the dispersion obtained as described above, the silver nanoparticles were blended in a percentage of 5%.

Onto a 30 mm×30 mm SUS substrate as the electrode substrate 2, the mixture (D) obtained as described above was applied dropwise, and then the substrate was spun by a spin coating method at spin speeds raised from 0 rpm to 3000 rpm over 5 seconds, and further spun at 3000 rpm for 10 seconds. Thus, the insulating fine particles 5 and the silver nanoparticles were deposited to obtain the electron acceleration layer 4. The film thickness of the electron acceleration layer 4 was 1.5 μm.

Then, the thin-film electrode 3 was formed on a surface of the electron acceleration layer 4 with a magnetron sputtering apparatus to obtain the electron emitting element of Comparative Example 1. Gold was used as the material of the film formed as the thin-film electrode 3, the thickness of the thin-film electrode 3 was 12 nm, and the area of the thin-film electrode 3 was 0.28 cm$^2$.

Figure 6:
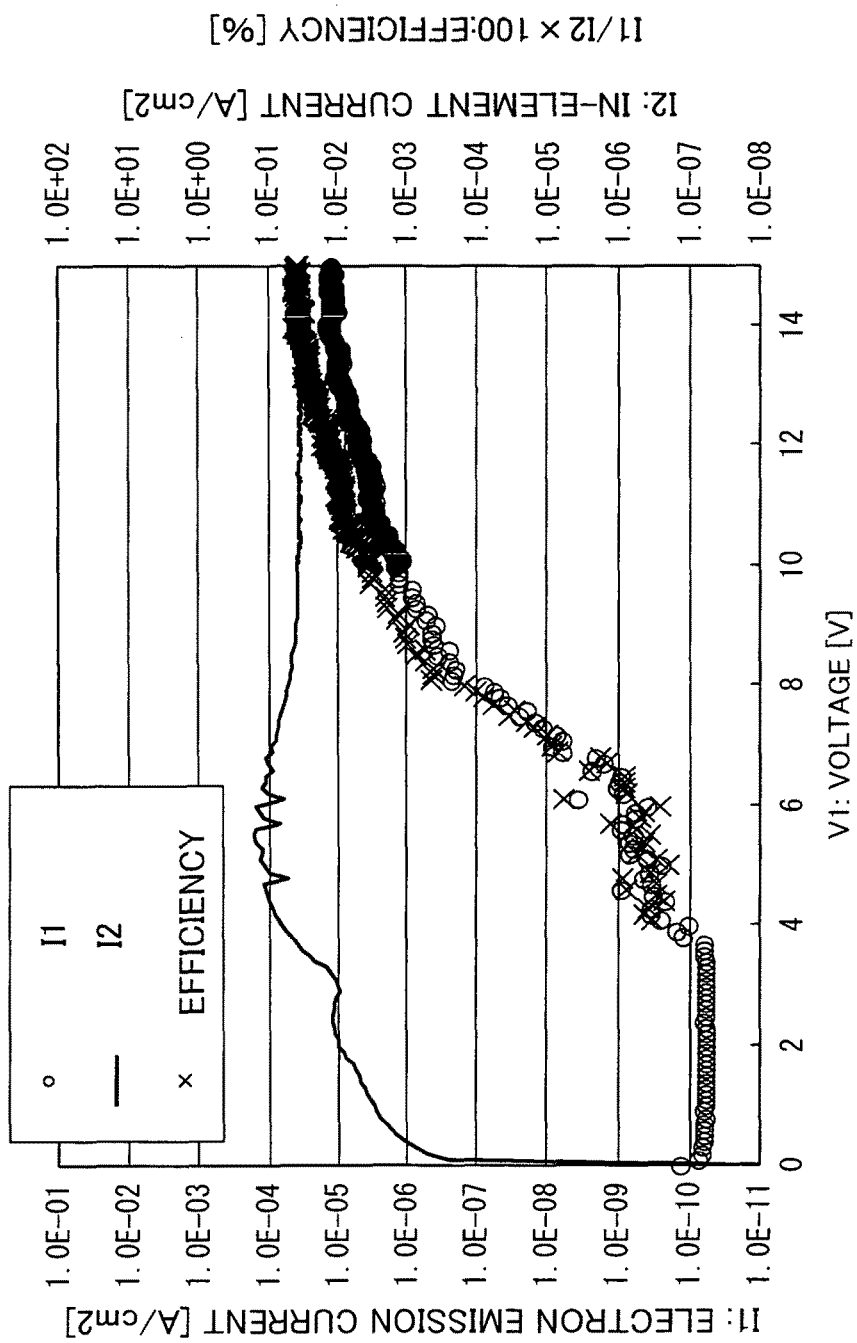
FIG. 6 is a drawing illustrating a result (VI characteristics) of an electron emitting element of Comparative Example 1 measured for the electron emission current and the in-element current.

When the voltage V1 applied to the thin-film electrode 3 was 14.6 V and the voltage V2 applied to the counter electrode 8 was 50 V, it was confirmed that the in-element current I1 per unit area was 0.0309 A/cm$^2$, the electron emission current I2 per unit area was 0.0130 mA/cm$^2$ and the element efficiency was 0.042%. Since electrons do not scatter in vacuum, the amount of the electron emission current is not dependent on the voltage applied to the counter electrode. FIG. 6 shows result of the measurement.

Reference to FIG. 5 and FIG. 6 has revealed that the element efficiency of the electron emitting element 1 of Example 1 was 1.17% while the element efficiency of the electron emitting element of Comparative Example 1 was 0.042%, that is, the electron emitting element 1 of Example 1 has a higher element efficiency, being capable of emitting more electrons at a less in-element current.

Embodiment 2

Figure 7:
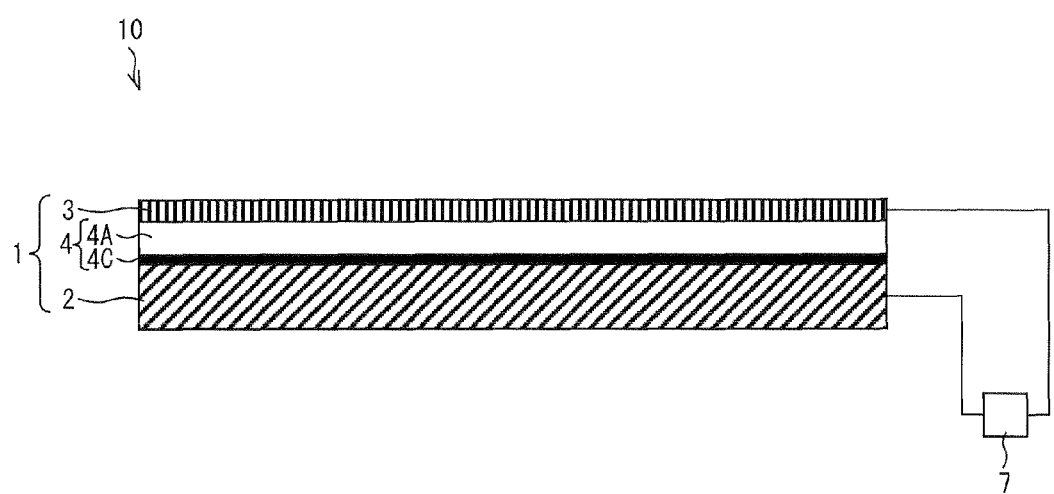
FIG. 7 is a schematic view illustrating a configuration of an electron emitting element according to Embodiment 2 of the present invention.

FIG. 7 is a schematic view illustrating a configuration according to Embodiment 2 of the present invention. As in the case of Embodiment 1, the electron emitting element 1 according to Embodiment 2 includes an insulating fine particle layer as the electron acceleration layer 4. However, the electron emitting element 1 according to Embodiment 2 is different from Embodiment 1 in that the insulating fine particle layer does not contain the conductive fine particles 6. The electron emitting element 1 according to Embodiment 2 has a carbon film 4C and an insulating fine particle layer 4A as the electron acceleration layer 4. Hereinafter, such an electron acceleration layer 4, which is different from that of Embodiment 1, will be described.

The electron acceleration layer 4 in Embodiment 2 includes the carbon film 4C formed on the electrode substrate 2 and the insulating fine particle layer 4A formed on the carbon film 4C. On the insulating fine particle layer 4A, the thin-film electrode 3 is formed. The carbon film 4C and the insulating fine particle layer 4A between the electrode substrate 2 and the thin-film electrode 3 compose the electron acceleration layer 4.

The effect of the electron acceleration layer including the carbon film can be described as follows. That is, when a voltage is applied between the electrode substrate 2 and the thin-film electrode 3, electrons move from the electrode substrate 2 to the carbon film 4C, and the electrons further move from the carbon film 4C to the surfaces of the insulating fine particles provided on the carbon film 4C. Interposed between the electrode substrate 2 having fine rough parts and the insulating fine particle layer to make them stick together into close contact (enhance adhesion therebetween), the carbon film 4C has a function of facilitating electrons to uniformly move between the electrode substrate and the insulating fine particles. Thus, the interposition of the carbon film between the electrode substrate and the insulating fine particles allows uniform and efficient move of electrons. Since the resistance inside of the insulating fine particles is high, electrons are conducted through the surfaces of the insulating fine particles and trapped at impurities and a surface preparation agent on the surfaces of the insulating fine particles or points of contact among the insulating fine particles. In a lower part of the thin-film electrode 3, the applied voltage together with an electric field formed by trapped electrons form an intense electric field, and the electrons are accelerated by the intense electric field to be emitted from the thin-film electrode 3.

On the other hand, since the insulating fine particle layer 4A is composed of insulating fine particles being monodisperse fine particles and filled with the fine particles uniformly, points of contact among the insulating fine particles are uniformly distributed in the insulating fine particle layer 4A, and conductive paths through which electrons are conducted will also be uniformly distributed. It is therefore possible to conduct electrons while efficiently trapping the electrons. As a result, more ballistic electrons are generated so that a large amount of electrons are emitted from the thin-film electrode 3.

Preferably, the carbon film 6 has a thickness of 5 nm to 300 nm in order to produce the above-described effect. More preferably, the carbon film 6 has a thickness of 10 nm to 100 nm. Thereby, as described above, the carbon film can smoothen the fine rough parts of the electrode substrate to facilitate electrons to uniformly move to the insulating fine particles. Consequently, the electron emitting element can emit electrons uniformly from its entire surface.

In order to accelerate electrons by applying an intensive electric field with a voltage as low as possible, the carbon film 4C and the insulating fine particle layer 4A preferably have a thickness (thickness of the electron acceleration layer 4) as small as possible. Preferably, in the case of Embodiment 2, the carbon film 4C and the insulating fine particle layer 4A (electron acceleration layer 4) have a thicknesses of 20 nm to 3000 nm. More preferably, the carbon film 4C and the insulating fine particle layer 4A (electron acceleration layer 4) have a thicknesses of 30 nm to 1000 nm. Thereby, the electron acceleration layer 4 can be formed to have a uniform thickness, and adjustment of the electric resistance in a direction of the layer thickness of the electron acceleration layer will be easy. As a result, electrons can be emitted uniformly over the entire surface of the electron emitting element, so that the electrons can be emitted from the thin-film electrode of the electron emitting element efficiently.

Production Method

Next, a method for producing the electron emitting element 1 according to Embodiment 2 will be described.

First, a dispersion of insulating fine particles obtained by dispersing the monodisperse insulating fine particles 5 in water is prepared. The materials of the dispersion of insulating fine particles are selected as described in Embodiment 1.

Subsequently, the carbon film is formed on the electrode substrate 2 by vapor deposition. As the material of the carbon film, lead of a propelling pencil is practical. Under vacuum, lead of a propelling pencil is heated at a current of 10 A to 20 A to be vapor-deposited for 10 seconds to 200 seconds.

Subsequently, the dispersion of insulating fine particles prepared is applied onto the carbon film 4C by a spin coating method to form the insulating fine particle layer 4A. The formation of the insulating fine particle layer 4A is performed in the same manner as in Embodiment 1.

Subsequently, the thin-film electrode 3 is formed on the insulating fine particle layer 4A formed. The formation of the thin-film electrode 3 is also performed in the same manner as in Embodiment 1. Thus, the electron emitting element according to Embodiment 2 is completed.

Example 2

Hereinafter, an example of the electron emitting element according to Embodiment 2 will be described.

A 24 mm×24 mm aluminum substrate was used as the electrode substrate 2. The electrode substrate 2 was washed with ultrapure water including a surfactant by ultrasonic washing, washed in running ultrapure water, and then washed by UV irradiation under vacuum of 20 Pa for 10 minutes.

The carbon film 6 was formed on the electrode substrate 2 washed as described above. Specifically, lead of a propelling pencil, Hi-uni B 0.5×60 mm (product by Mitsubishi Pencil Co., Ltd.), was heated at a current of 18 A and vapor-deposited for 164 seconds. Further, the carbon film 6 was irradiated with UV under vacuum of 20 Pa for 10 minutes to modify a surface thereof to be hydrophilic.

An insulating fine particle layer was formed on the resulting carbon film. Specifically, 1 mL of colloidal silica MP-1040 manufactured by Nissan Chemical Industries, Ltd., wherein the monodisperse pariparticles accounting for 80% of the volume distribution have an average particle diameter of 117 nm, a standard deviation of 0.26 nm and a CV of 0.22%, as the insulating fine particles was applied dropwise onto the electrode substrate, and the substrate was spun by a spin coating method at spin speeds raised from 0 rpm to 3000 rpm over 5 seconds, and further spun at 3000 rpm for 10 seconds. Thus, the insulating fine particle layer was formed. Thus, the electron acceleration layer 4 filled with the monodisperse insulating fine particles in lines and including the carbon film was obtained. The film thickness of the electron acceleration layer 4 was 980 nm.

Then, the thin-film electrode 3 was formed on a surface of the electron acceleration layer 4 with a magnetron sputtering apparatus to obtain the electron emitting element 1 of Example 2. Gold was used as the material of the film formed as the thin-film electrode 3, the thickness of the thin-film electrode 3 was 40 nm, and the area of the thin-film electrode 3 was 0.01 cm$^2$.

The measurement system illustrated in FIG. 4 was set up in vacuum at $1\times10^{-8}$ ATM and an electron emission experiment was performed to study the electron emitting element 1 of Example 2 produced as described above for electron emission characteristics.

In the measurement system in FIG. 4, the counter electrode 8 was disposed on the side of the thin-film electrode 3 of the electron emitting element 1 in such a manner that the counter electrode 8 and the thin-film electrode 3 had the insulating spacer 9 (diameter: 1 mm) therebetween. The power supply 7A was provided to apply the voltage V1 between the electrode substrate 2 and the thin-film electrode 3 of the electron emitting element 1, and the power supply 7B was provided to apply the voltage V2 to the counter electrode 8. The in-element current I1, which flowed between the thin-film electrode 3 and the power supply 7A, per unit area (current density in the element) and the electron emission current I2, which flowed between the counter electrode 8 and the power supply 7B, per unit area (electron emission current density) were measured.

Figure 8:
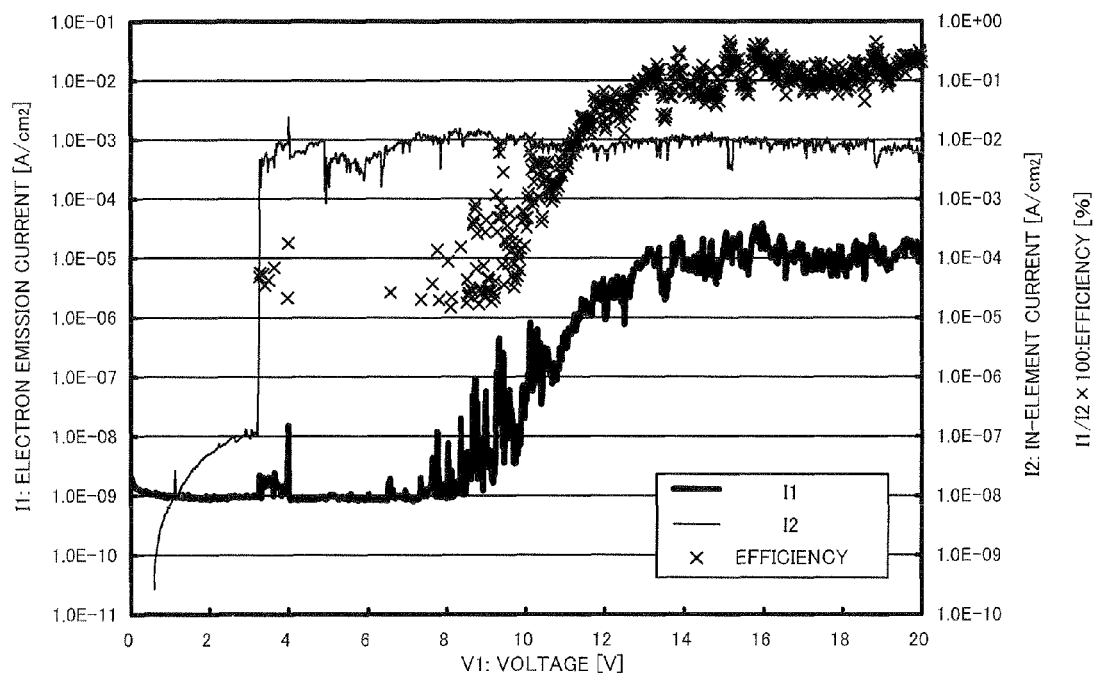
FIG. 8 is a drawing illustrating a result (VI characteristics) of an electron emitting element of Example 2 measured for the electron emission current and the in-element current.

When the voltage V1 applied to the thin-film electrode 3 was 15.96 V and the voltage V2 applied to the counter electrode 8 was 100 V, it was confirmed that the in-element current I1 per unit area was 0.00987 A/cm², the electron emission current I2 per unit area was 0.0384 mA/cm² and the element efficiency was 0.39%. FIG. 8 shows result of the measurement.

Comparative Example 2

As a comparative example, an electron emitting element was produced according to the patent application (Japanese Patent Application No. 2008-295722) that the applicant of the present application applied prior to the present application. As in the case of Example 2, the measurement system illustrated in FIG. 4 was used in the measurement for the electron emission characteristics. That is, the electron emission experiment was performed in vacuum at $1 \times 10^{-8}$ ATM to study the element for the electron emission characteristics.

The comparative example was prepared as follows. That is, 3 mL of toluene solvent and, as the insulating fine particles 5, 0.5 g of spherical silica particles having an average diameter of 110 nm were put into a 10-mL reagent bottle, and the reagent bottle was applied to an ultrasonic disperser to prepare a dispersion (C) of the insulating fine particles.

Next, 0.026 g of silver nanoparticles (average diameter: 10 nm, insulating coating with alcoholate: 1 nm, product by Ouyou Nano Laboratory K.K.) as metal fine particles was added to the dispersion (C), and the reagent bottle was applied to an ultrasonic disperser to prepare a mixture (D) of the insulating fine particles 5 and the silver nanoparticles. In the dispersion obtained as described above, the silver nanoparticles were blended in a percentage of 5%.

Onto a 30 mm×30 mm SUS substrate as the electrode substrate 2, the mixture (D) obtained as described above was applied dropwise, and then the substrate was spun by a spin coating method at spin speeds raised from 0 rpm to 3000 rpm over 5 seconds, and further spun at 3000 rpm for 10 seconds. Thus, the insulating fine particles 5 and the silver nanoparticles were deposited to obtain the electron acceleration layer 4. The film thickness of the electron acceleration layer 4 was 1.5 μm.

Then, the thin-film electrode 3 was formed on a surface of the electron acceleration layer 4 with a magnetron sputtering apparatus to obtain the electron emitting element of Comparative Example 2. Gold was used as the material of the film formed as the thin-film electrode 3, the thickness of the thin-film electrode 3 was 12 nm, and the area of the thin-film electrode 3 was 0.28 cm².

Figure 9:
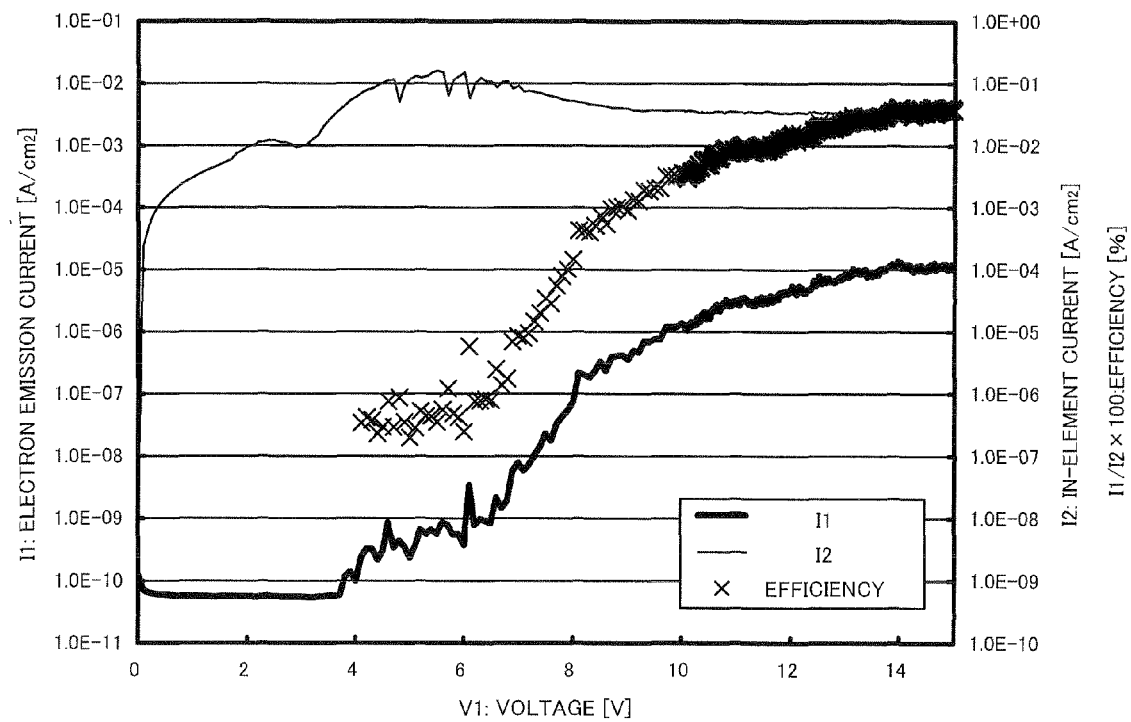
FIG. 9 is a drawing illustrating a result (VI characteristics) of an electron emitting element of Comparative Example 2 measured for the electron emission current and the in-element current.

When the voltage V1 applied to the thin-film electrode 3 was 14.6 V and the voltage V2 applied to the counter electrode 8 was 50 V, it was confirmed that the in-element current I1 per unit area was 0.0309 A/cm², the electron emission current I2 per unit area was 0.0130 mA/cm² and the element efficiency was 0.042%. Since electrons do not scatter in vacuum, the amount of the electron emission current is not dependent on the voltage applied to the counter electrode. FIG. 9 shows result of the measurement.

Reference to FIG. 8 and FIG. 9 has revealed that the electron emitting element 1 of Example 2 showed an electron emission current of 0.0384 mA/cm² and an element efficiency of 0.39%, while the electron emitting element of Comparative Example 2 showed an electron emission current of 0.0130 mA/cm² and an element efficiency of 0.042%. This indicates that the electron emitting element of Example 2 has been improved in amount of electrons being emitted and electron emission efficiency, showing a higher electron emission current and element efficiency.

Embodiment 3

Figure 10:
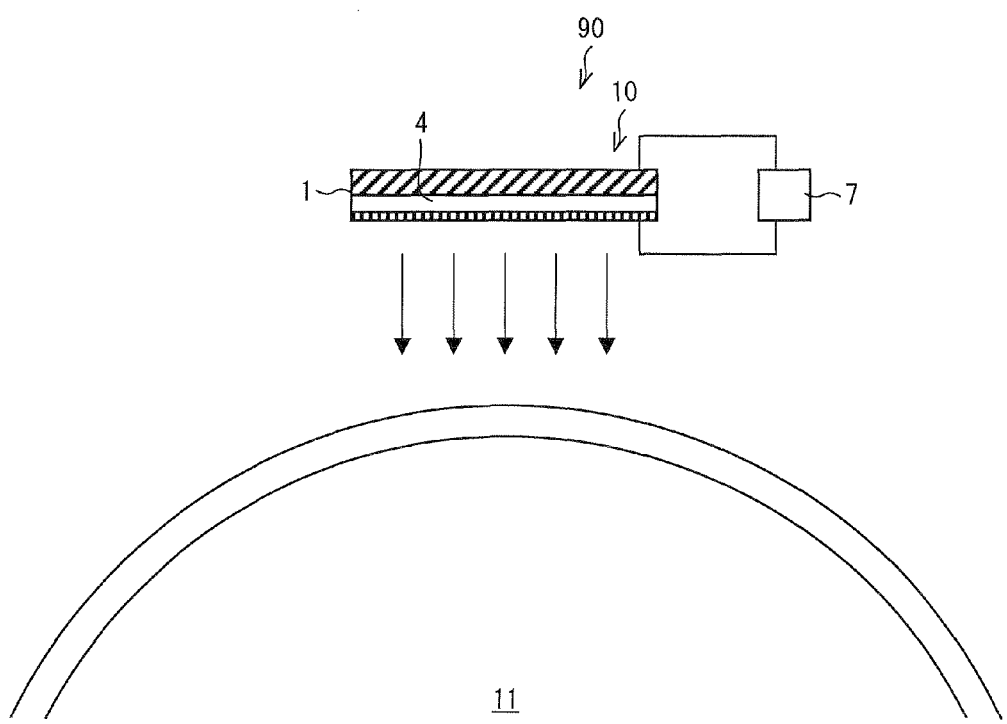
FIG. 10 is a drawing illustrating an example of a charging device including an electron emitting element of the present invention.

FIG. 10 illustrates an example of a charging device 90 and an image forming apparatus according to an embodiment of the present invention.

The charging device 90 includes the electron emitting element 1 of Embodiment 1 and the power supply 7 for applying a voltage to the electron emitting element, and is used as a device for charging a surface of a photoreceptor drum 11 (the configuration is the same as that of the above-described electron emitting device 10).

The image forming apparatus includes the charging device 90, and the electron emitting element 1 in the charging device 90 is disposed opposite the photoreceptor drum 11 to be charged. Application of a voltage to the electron emitting element 1 causes electron emission so that a surface of the photoreceptor drum 11 is electrically charged.

In the image forming apparatus of the present invention, other than the charging device 90, known constituent members can be used. The electron emitting element 1 serving as the charging device 90 is preferably disposed so as to be, for example, 3 mm to 5 mm apart from the surface of the photoreceptor drum 11. Further, it is preferable that a voltage of approximately 25 V is applied to the electron emitting element 1. The electron acceleration layer of the electron emitting element 1 is preferably configured such that 1 μA/cm² of electrons are emitted per unit time in response to application of a voltage of 25 V, for example.

Even when the electron emitting device 10 serving as the charging device 90 operates in the atmosphere, electric discharge does not occur. The charging device 90 therefore generates no ozone. Ozone is harmful to human bodies, and therefore regulated in various environmental standards. Even if ozone is not discharged to the outside of the apparatus, ozone oxidizes and deteriorates an organic material such as the photoreceptor drum 11 and a belt in the apparatus. Such a problem can be solved by using the electron emitting device 10 of the present invention for the charging device 90 and further including such a charging device 90 in the image forming apparatus. In addition, since the electron emitting element 1 is improved in the electron emission efficiency, the charging device 90 can perform the charging efficiently.

Further, the electron emitting device 10 serving as the charging device 90 is configured as a planar electron source. Therefore, the electron emitting device 10 is capable of charging the photoreceptor drum 11 on an area that has a width in a rotation direction. This provides many chances for charging a section of the photoreceptor drum 11. Therefore, the charging device 90 can perform more uniform electric charging as compared to a wire charging device, which performs electric charging line by line. Further, the charging device 90 has an advantage such that the voltage being applied is approximately 10 V, which is far lower than that of a corona discharge device, which requires a voltage of several kV be applied.

Embodiment 4

Figure 11:
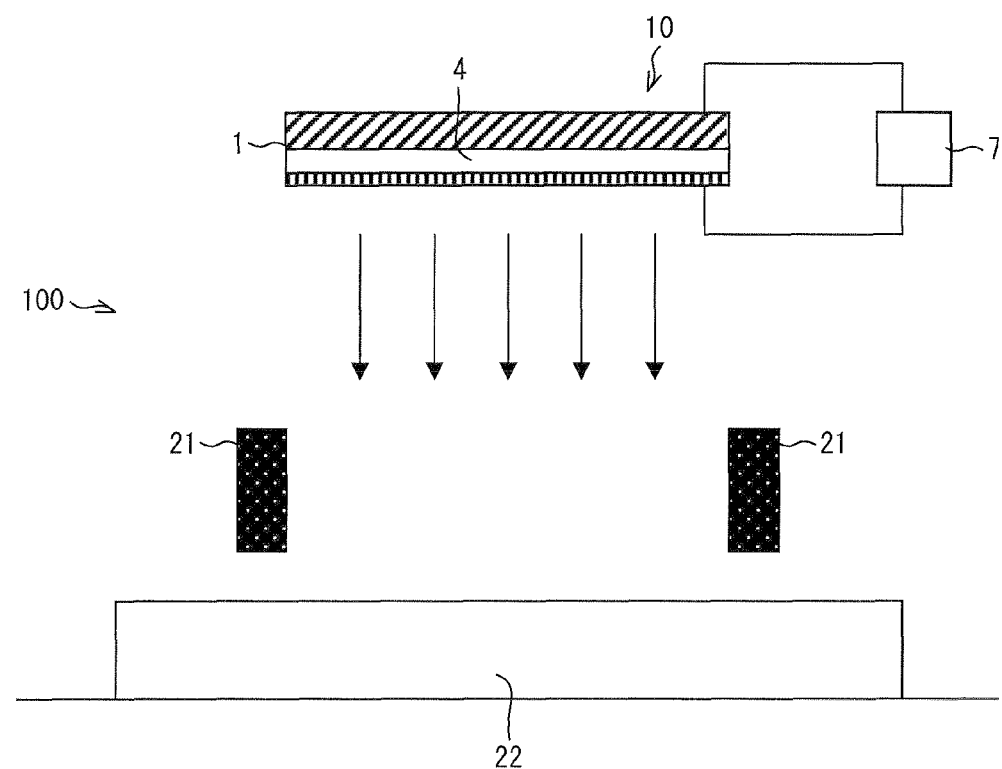
FIG. 11 is a drawing illustrating an example of an electron-beam curing device including an electron emitting element of the present invention.
Figure 1:
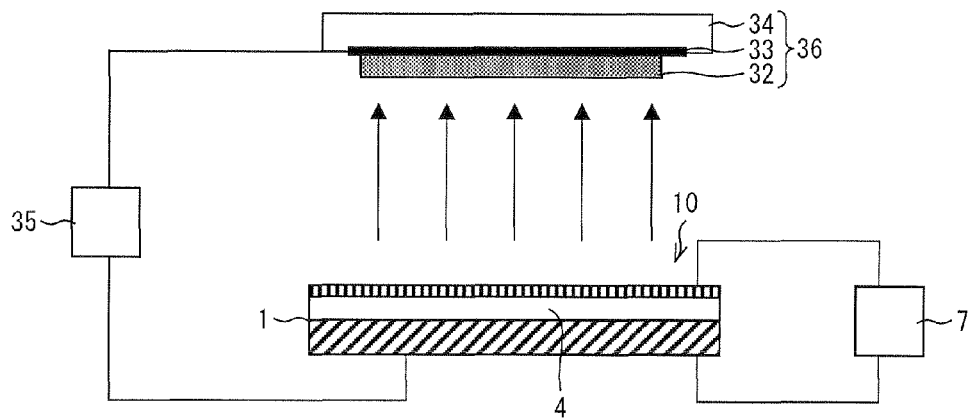
Figure 1:
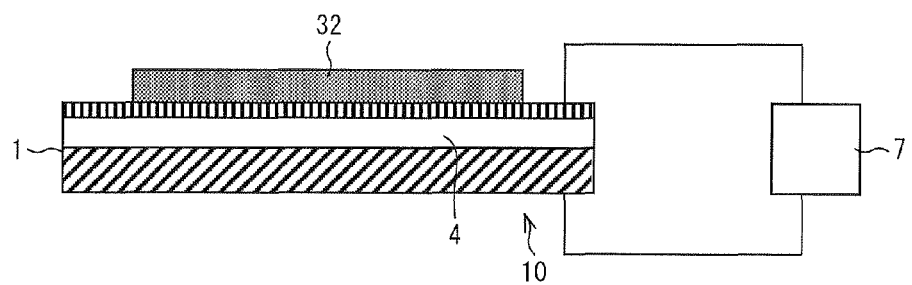

FIG. 11 illustrates an example of an electron-beam curing device 100 according to an embodiment of the present invention. The electron-beam curing device 100 comprises the electron emitting device 10 having the electron emitting element 1 of Embodiment 1 and the power supply 7 for applying a voltage to the electron emitting element, and an accelerating electrode 21 for accelerating electrons. In the electron-beam curing device 100, the electron emitting element 1 serving as an electron source emits electrons, and the electrons emitted are accelerated by the accelerating electrode 21 so that the electrons collide with a resist 22. Energy necessary for curing the general resist 22 is not more than 10 eV. In terms of energy, therefore, the accelerating electrode is not necessary. However, in order to entirely cure the resist 22 having a thickness of 1 μm, for example, an accelerating voltage of approximately 5 kV is required, because a penetration depth of an electron beam is determined by a function of energy of electrons.

In a conventional general electron-beam curing device, an electron source is sealed in vacuum and caused to emit electrons by application of a high voltage (50 kV to 100 kV). The electrons are taken out through an electron window and used for irradiation. According to this electron emission method, loss of a large amount of energy occurs in the electrons when the electrons pass through the electron window. Further, the electrons that have reached the resist also pass through the resist in the thickness direction, because the electrons have high energy. This leads to decrease in energy utilization efficiency. In addition, since an area on which electrons are thrown at a time is small and irradiation is performed in a manner drawing with dots, throughput is low.

On the other hand, the electron-beam curing device of the present invention including the electron emitting device 10 can operate in the atmosphere, so that the electron-beam curing device does not need to be sealed in vacuum. In addition, since the electron emitting element 1 is improved in the electron emission efficiency, the electron-beam curing device can perform the irradiation with electron beams efficiently. Further, the electron-beam curing device is free from energy loss, because the electrons do not pass through the electron window. This allows reduction of the voltage being applied. Moreover, since the electron-beam curing device has a planar electron source, the throughput increases significantly. When electrons are emitted in accordance with a pattern, maskless exposure will be possible.

Embodiment 5

Figure 14:
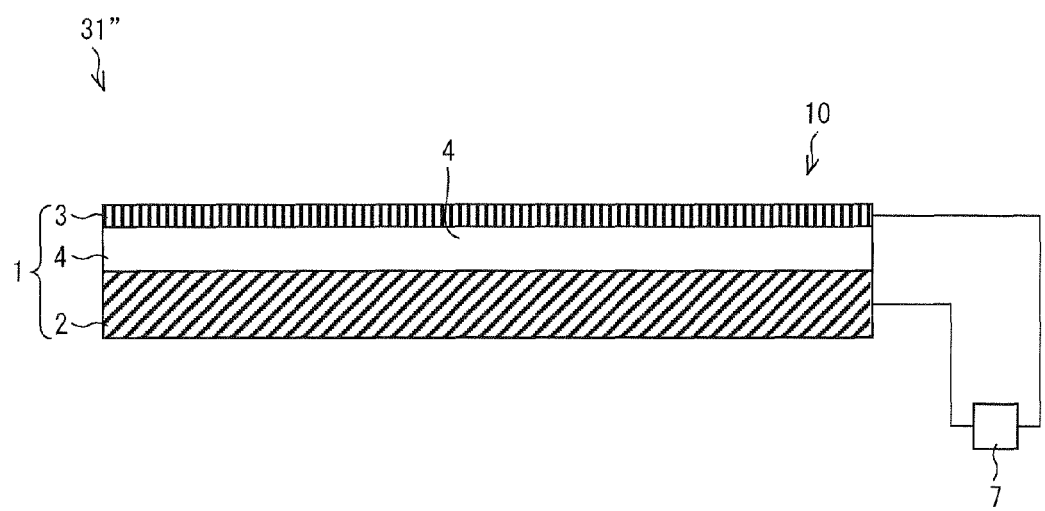
FIG. 14 is a drawing illustrating still another example of the light emitting device including an electron emitting element of the present invention.

FIGS. 12 to 14 illustrates examples of a light emitting device according to an embodiment of the present invention, respectively.

A light emitting device 31 illustrated in FIG. 12 comprises an electron emitting device having the electron emitting element 1 of Embodiment 1 and the power supply 7 for applying a voltage to the electron emitting element; and a light-emitting section 36 disposed in a position that is apart from the electron emitting element 1 and that faces the electron emitting element 1. The light-emitting section 36 has a laminated structure including a glass substrate 34 serving as a base material, an ITO film 33 and a luminous body 32.

Suitable materials of the luminous body 32 are materials that are excited by electrons and that correspond to red light emission, green light emission and blue light emission, respectively. Examples usable as such materials corresponding to red include $Y_2O_3$: Eu and (Y, Gd) $Bo_3$: Eu; examples usable as such materials corresponding to green include $Zn_2SiO_4$: Mn and $BaAl_{12}O_{19}$: Mn; and examples usable as such materials corresponding to blue include $BaMgAl_{10}O_{17}$: $Eu^{2+}$. A film of the luminous body 32 is formed on the ITO film 33 formed on a surface of the glass substrate 34. The luminous body 32 preferably has a thickness of approximately 1 μm. Further, the ITO film 33 may have any thickness as long as the ITO film 33 can reliably have electric conductivity at the thickness. In the present embodiment, the ITO film 33 is set to 150 nm in thickness.

For forming the film of the luminous body 32, a mixture of an epoxy resin serving as a binder and fluorescent fine particles is prepared, and a film of the mixture may be formed by a known method such as a bar coater method and a dropping method.

In this embodiment, in order to increase a brightness of light emitted from the luminous body 32, it is necessary to accelerate, toward the luminous body, electrons which are emitted from the electron emitting element 1. Accordingly, between the electrode substrate 2 of the electron emitting element 1 and the ITO film 33 of the light-emitting section 36, a power supply 35 is preferably provided for applying a voltage to form an electric field for accelerating the electrons. In this case, it is preferable that: a distance between the luminous body 32 and the electron emitting element 1 is 0.3 mm to 1 mm; a voltage applied by the power supply 7 is 18 V; and a voltage applied by the power supply 35 is 500 V to 2000 V.

A light emitting device 31' illustrated in FIG. 13 includes the electron emitting element 1 of Embodiment 1, the power supply 7 for applying a voltage to the electron emitting element, and the luminous body 32. In the light emitting device 31', the luminous body 32 is a planar luminous body which is provided on a surface of the electron emitting element 1. In the present embodiment, a layer of the luminous body 32 is formed on the surface of the electron emitting element 1, in such a manner that a coating solution comprising a mixture of epoxy resin serving as a binder and luminous-body fine particles is prepared as described above and a film of the solution is formed on the surface of the electron emitting element 1. Note that, because the electron emitting element 1 itself has a structure which is vulnerable to external force, the element may be damaged as a result of use of the bar coater method. It is therefore preferable to use the dropping method or the spin coating method.

A light emitting device 31" illustrated in FIG. 14 comprises the electron emitting device 10 having the electron emitting element 1 of Embodiment 1 and the power supply 7 for applying a voltage to the electron emitting element. Further, in the electron acceleration layer 4 of the electron emitting element 1, fluorescent fine particles as a luminous body 32' are mixed. In this case, the fine particles of the luminous body 32' may serve also as the insulating fine particles 5. Generally, however, the fluorescent fine particles have a low electric resistance, which is obviously lower than the electric resistance of the insulating fine particles 5. Therefore, when the fluorescent fine particles are mixed instead of the insulating fine particles 5, the amount of the fluorescent fine particles should be kept to a small amount. For example, when spherical silica particles (average diameter of 110 nm) are used as the insulating fine particles 5 and ZnS: Mg (average diameter of 500 nm) is used as the luminous-body fine particles, an appropriate mixture ratio by weight of the insulating fine particles 5 and the luminous-body fine particles is approximately 3:1.

In the light emitting devices 31, 31', 31", electrons emitted from the electron emitting element 1 are caused to collide with the fluorescent body 32 or 32' so that light is emitted. Since the electron emitting element 1 is improved in the electron emission efficiency, the light emitting devices 31, 31', 31" can emit light efficiently. Since the electron emitting device 10 can emit electrons in the atmosphere, the light emitting devices 31, 31', 31" can work in the atmosphere. However, sealed in vacuum, the light emitting devices 31, 31', 31" can work more efficiently because the electron emission current increases.

Figure 15:
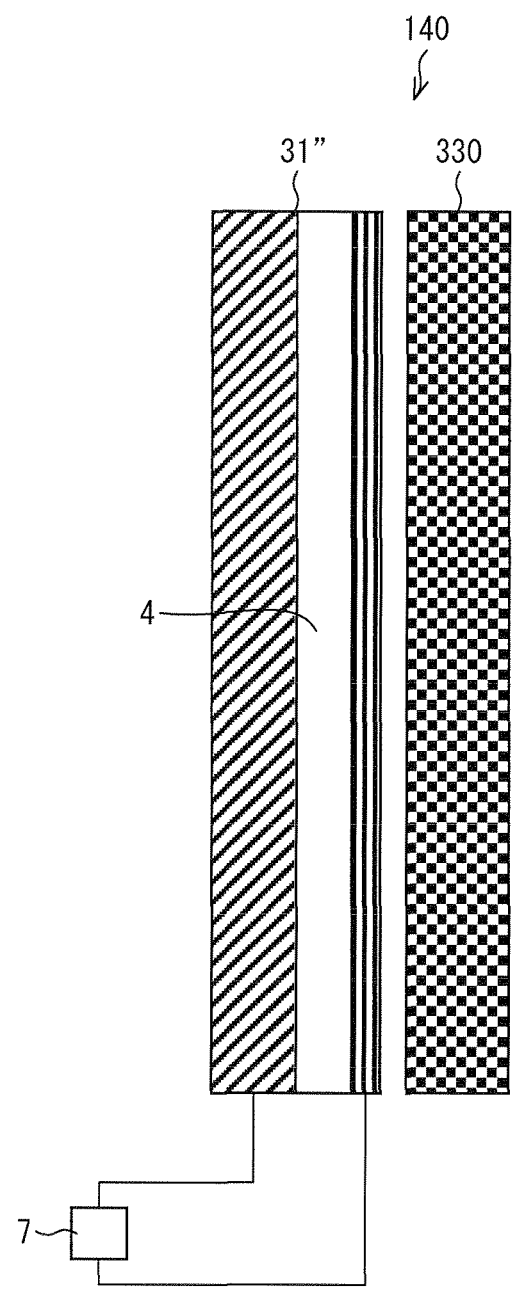
FIG. 15 is a drawing illustrating an example of an image display device equipped with a light emitting device including an electron emitting element of the present invention.

Further, FIG. 15 illustrates an example of an image display device according to an embodiment of the present invention. An image display device 140 illustrated in FIG. 15 includes the light emitting device 31" illustrated in FIG. 12 and a liquid crystal panel 330. In the image display device 140, the light emitting device 31" is disposed behind the liquid crystal panel 330 and used as a backlight. When the light emitting device 31" is used in the image display device 140, it is preferable that a voltage of 20 V to 35 V is applied to the light emitting device 31". The light emitting device 31" should be configured to emit, for example, 10 µA/cm$^2$ of electrons per unit time at the voltage of 20 V to 35 V. Further, it is preferable that the distance between the light emitting device 31" and the liquid crystal panel 330 is approximately 0.1 mm.

When the light emitting device 31 illustrated in FIG. 12 is used for the image display device according to the embodiment of the present invention, a plurality of the light emitting devices 31 may be arranged in a matrix so as to form a shape that allows the light emitting devices 31 themselves serving as an FED to form and display an image. In this case, it is preferable that a voltage of 20 V to 35 V is applied to the light emitting devices 31. The light emitting devices 31 should be configured to emit, for example, 10 µA/cm$^2$ of electrons per unit time at the voltage of 20 V to 35 V.

Embodiment 6

Figure 16:
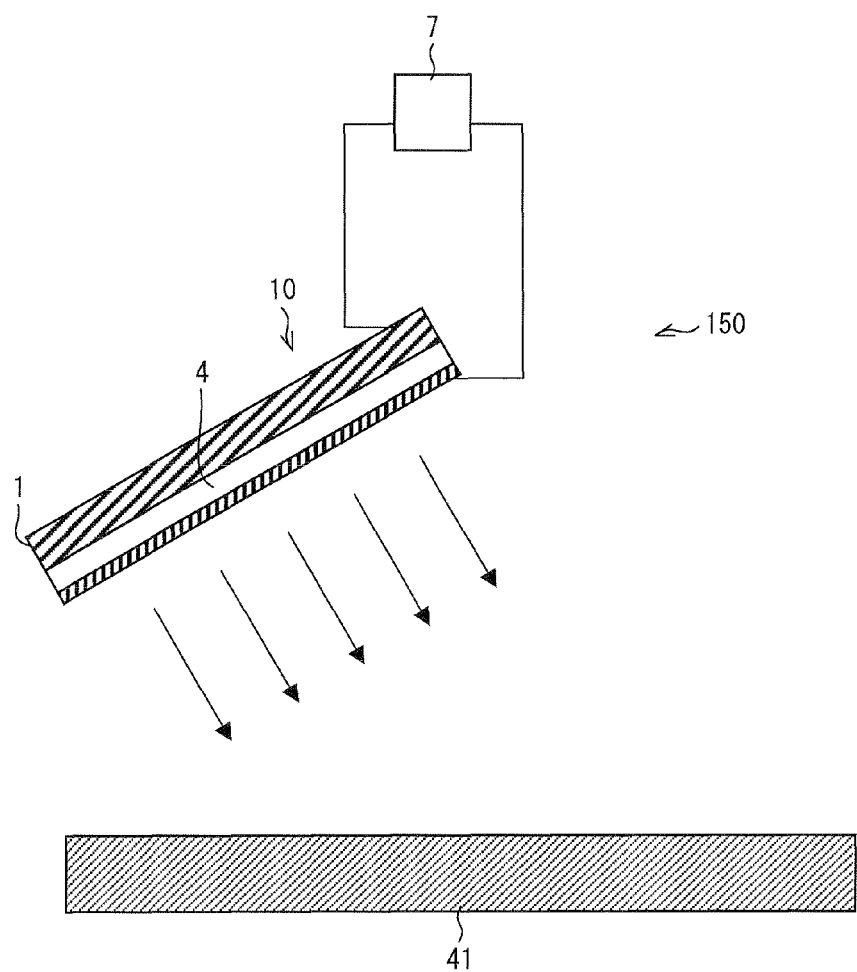
FIG. 16 is a drawing illustrating an example of an air blowing device including an electron emitting element of the present invention and a cooling device equipped with the air blowing device.
Figure 17:
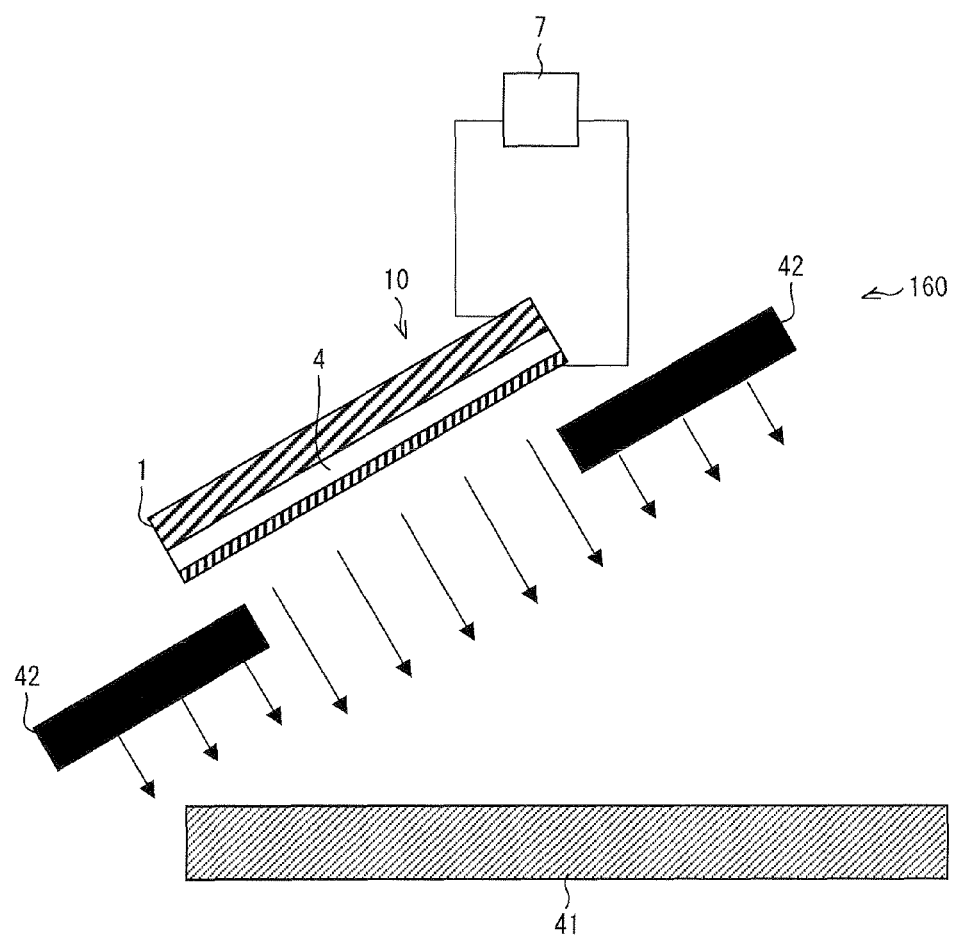
FIG. 17 is a drawing illustrating another example of the air blowing device including an electron emitting element of the present invention and the cooling device equipped with the air blowing device.

FIG. 16 and FIG. 17 illustrate examples of an air blowing device according to an embodiment of the present invention, respectively. The following description deals with a case where the air blowing device of the present invention is used as a cooling device. However, application of the air blowing device is not limited to a cooling device.

An air blowing device 150 illustrated in FIG. 16 comprises the electron emitting device 10 having the electron emitting element 1 and the power supply 7 for applying a voltage to the electron emitting element. In the air blowing device 150, the electron emitting element 1 emits electrons toward an object 41 to be cooled so that ion wind is generated and the object 41 electrically grounded is cooled. In the cooling, it is preferable that a voltage of approximately 18 V is applied to the electron emitting element 1 and the electron emitting element 1 emits, for example, 1 µA/cm$^2$ of electrons per unit time in the atmosphere at the voltage.

In addition to the configuration of the air blowing device 150 illustrated in FIG. 16, an air blowing device 160 illustrated in FIG. 17 includes a blowing fan 42. In the air blowing device 160 illustrated in FIG. 17, the electron emitting element 1 emits electrons toward the object 41 to be cooled, and the blowing fan 42 blows air toward the object 41 to send the electrons emitted from the electron emitting element toward the object 41 and generate ion wind so that the object 41 electrically grounded is cooled down. In this case, it is preferable that an air volume generated by the blowing fan 42 is 0.9 L to 2 L per minute per square centimeter.

When the object 41 is cooled only by air blown by a fan or the like as in the case of a conventional air blowing device or a conventional cooling device, the flow rate on a surface of the object 41 will be 0 and the air in a section from which heat is dissipated most desirably is not replaced, leading to low cooling efficiency. However, when electrically charged particles such as electrons or ions are included in the air blown, the air blown is attracted to the surface of the object 41 by electric force when in the vicinity of the object 41 to allow the air in the vicinity of the surface of the object 41 to be replaced. Here, since the air blowing devices 150, 160 of the present invention blow air including electrically charged particles such as electrons or ions, the cooling efficiency is significantly improved. Furthermore, since the electron emitting element 1 is improved in the electron emission efficiency, the air blowing devices 150, 160 can perform the cooling more efficiently. The air blowing devices 150, 160 can operate also in the atmosphere.

The present invention is not limited to the embodiments and the examples described above, and various other changes may be made within the scope of the invention as defined by the appended claims. That is, other embodiments obtained by combining technical means appropriately changed within the scope of the present invention as defined by the appended claims are also included in the technical scope of the present invention. For example, the electron emitting element of Embodiment 1 may be applied to the devices of Embodiments 3 to 6.

INDUSTRIAL APPLICABILITY

An electron emitting element of the present invention can emit a sufficient amount of electrons by application of a moderate voltage and can continuously operate for a longer time. Accordingly, the electron emitting element of the present invention can be suitably applied to, for example, a charging device of an image forming apparatus such as an electrophotographic copying machine, a printer and a facsimile; an electron-beam curing device; an image display device when in combination with a luminous body; and a cooling device when utilizing ion wind generated by electrons emitted therefrom.

What is claimed is:

1. An electron emitting element, comprising: a first electrode; an insulating fine particle layer formed on the first electrode and composed of insulating fine particles uniformly filled in the layer; and a second electrode formed on the insulating fine particle layer, wherein the insulating fine particles are monodisperse fine particles having a coefficient of variation of 10% or less, when the coefficient of variation is defined as the ratio of the standard deviation to an average particle diameter, and when voltage is applied between the first electrode and the second electrode, electrons are discharged from the first electrode into the insulating fine particle layer and accelerated through the insulating fine particle layer to be emitted from the second electrode.

2. The electron emitting element according to claim 1, wherein the insulating fine particle layer further contains conductive fine particles.

3. The electron emitting element according to claim 2, wherein the conductive fine particles are formed of a conductive material having a potent antioxidative effect.

4. The electron emitting element according to claim 2, wherein the conductive fine particles are fine particles containing at least one of gold, silver, platinum, palladium and nickel.

5. The electron emitting element according to claim 2, wherein each conductive fine particle is covered with an insulating material, each second insulating fine particle being smaller than the conductive fine particles in average diameter.

6. The electron emitting element according to claim 5, wherein the insulating material are particles containing at least one of alcoholates, fatty acids and alkanethiols.

7. The electron emitting element according to claim 2, wherein the conductive fine particles have an average particle diameter of 3 nm to 20 nm.

8. The electron emitting element according to claim 2, wherein the insulating fine particle layer has a film thickness of 8 nm to 3000 nm.

9. The electron emitting element according to claim 1, which further comprises a carbon film formed on the first electrode, wherein the insulating fine particle layer is formed on the carbon film.

10. The electron emitting element according to claim 9, wherein the carbon film has a thickness of 5 nm to 300 nm.

11. The electron emitting element according to claim 9, wherein the insulating fine particle layer has a film thickness of 20 nm to 3000 nm.

12. The electron emitting element according to claim 1, wherein the insulating fine particles are fine particles containing at least one of $SiO_2$, $Al_2O_3$ and $TiO_2$.

13. The electron emitting element according to claim 1, wherein the second electrode is formed of a material including at least one of gold, silver, carbon, tungsten, titanium, aluminum and palladium.

14. The electron emitting element according to claim 1, wherein the insulating fine particles have an average particle diameter of 5 nm to 1000 nm.

15. The electron emitting element according to claim 1, wherein the electron emitting element is used in a light emitting device comprising a fluorescent body and emits electrons to the fluorescent body to cause the fluorescent body to emit light.

16. The electron emitting element according to claim 15, wherein the electron emitting element is used in an image display device comprising the light emitting device.

17. The electron emitting element according to claim 1, wherein the electron emitting element is used in an air blowing device and emits electrons to generate ion wind.

18. The electron emitting element according to claim 1, wherein the electron emitting element is used in a cooling device and emits electrons to cool an object.

19. The electron emitting element according to claim 1, wherein the electron emitting element is used in a charging device comprising a photoreceptor and emits electrons to charge the photoreceptor.

20. The electron emitting element according to claim 19, wherein the electron emitting element is used in an image forming apparatus comprising the charging device.

21. The electron emitting element according to claim 1, wherein the electron emitting element is used in an electron-beam curing device.

22. The electron emitting element according to claim 1, which further comprises a power supply for applying a voltage between the first electrode and the second electrode.

* * * * *